(12) United States Patent
Dash et al.

(10) Patent No.: US 11,367,160 B2
(45) Date of Patent: Jun. 21, 2022

(54) SIMULTANEOUS COMPUTE AND GRAPHICS SCHEDULING

(71) Applicant: NVIDIA Corporation, Santa Clara, CA (US)

(72) Inventors: Rajballav Dash, San Jose, CA (US); Gregory Palmer, Cedar Park, TX (US); Gentaro Hirota, San Jose, CA (US); Lacky Shah, Los Altos Hills, CA (US); Jack Choquette, Palo Alto, CA (US); Emmett Kilgariff, San Jose, CA (US); Sriharsha Niverty, Karnataka (IN); Milton Lei, Santa Clara, CA (US); Shirish Gadre, Fremont, CA (US); Omkar Paranjape, Austin, TX (US); Lei Yang, Santa Clara, CA (US); Rouslan Dimitrov, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/053,341

(22) Filed: Aug. 2, 2018

(65) Prior Publication Data

US 2020/0043123 A1 Feb. 6, 2020

(51) Int. Cl.
*G06T 1/20* (2006.01)
*G06F 9/38* (2018.01)
*G06F 15/80* (2006.01)

(52) U.S. Cl.
CPC .............. *G06T 1/20* (2013.01); *G06F 9/3851* (2013.01); *G06F 9/3867* (2013.01); *G06F 15/8007* (2013.01)

(58) Field of Classification Search
CPC . G06T 1/20; G06T 1/60; G06F 9/3867; G06F 9/3851; G06F 15/8007;
(Continued)

(56) References Cited

U.S. PATENT DOCUMENTS

| | | | |
|---|---|---|---|
| 2002/0062435 A1* | 5/2002 | Nemirovsky | G06F 9/3851 712/7 |
| 2004/0243739 A1* | 12/2004 | Spencer | G06F 13/28 710/22 |

(Continued)

*Primary Examiner* — Jacinta M Crawford
*Assistant Examiner* — Kim Thanh T Tran
(74) *Attorney, Agent, or Firm* — Nixon & Vanderhye PC

(57) ABSTRACT

A parallel processing unit (e.g., a GPU), in some examples, includes a hardware scheduler and hardware arbiter that launch graphics and compute work for simultaneous execution on a SIMD/SIMT processing unit. Each processing unit (e.g., a streaming multiprocessor) of the parallel processing unit operates in a graphics-greedy mode or a compute-greedy mode at respective times. The hardware arbiter, in response to a result of a comparison of at least one monitored performance or utilization metric to a user-configured threshold, can selectively cause the processing unit to run one or more compute work items from a compute queue when the processing unit is operating in the graphics-greedy mode, and cause the processing unit to run one or more graphics work items from a graphics queue when the processing unit is operating in the compute-greedy mode. Associated methods and systems are also described.

26 Claims, 15 Drawing Sheets

(58) Field of Classification Search
CPC .... G06F 9/5027; G06F 9/4881; G06F 9/3887;
G06F 9/5016; G06F 9/5022
USPC ........................................................ 345/505
See application file for complete search history.

(56) References Cited

U.S. PATENT DOCUMENTS

| | | | |
|---|---|---|---|
| 2007/0179995 A1* | 8/2007 | Prahlad | G06F 11/1464 |
| 2009/0252230 A1* | 10/2009 | Zhan | H04N 19/43 |
| | | | 375/240.16 |
| 2010/0076941 A1* | 3/2010 | Dotsenko | G06F 17/10 |
| | | | 707/705 |
| 2012/0079503 A1* | 3/2012 | Dally | G06F 9/3851 |
| | | | 718/108 |
| 2012/0147021 A1* | 6/2012 | Cheng | G06F 9/545 |
| | | | 345/522 |
| 2013/0141447 A1* | 6/2013 | Hartog | G06T 1/20 |
| | | | 345/522 |
| 2015/0286472 A1* | 10/2015 | Lim | G06F 9/45525 |
| | | | 717/151 |
| 2016/0103715 A1* | 4/2016 | Sethia | G06F 9/4881 |
| | | | 718/106 |
| 2016/0170811 A1* | 6/2016 | Peacock | G06F 9/52 |
| | | | 718/106 |
| 2017/0374147 A1* | 12/2017 | McNair | H04L 67/1097 |
| 2018/0046577 A1* | 2/2018 | Chen | G06F 9/5061 |
| 2018/0293698 A1* | 10/2018 | Venkatesh | G06T 1/60 |
| 2019/0146800 A1* | 5/2019 | Ould-Ahmed-Vall | |
| | | | G06F 9/3891 |
| | | | 712/205 |

* cited by examiner

SIMULTANEOUS COMPUTE AND GRAPHICS SCHEDULING

CROSS-REFERENCE TO RELATED APPLICATIONS

This application is related to U.S. patent application Ser. No. 14/137,818 filed on Dec. 20, 2013, titled "System, method, and computer program product for simultaneous execution of compute and graphics workloads".

CLAIM OF PRIORITY

None.

FIELD OF THE INVENTION

The present disclosure relates to scheduling of tasks on a computer processor, more particularly to scheduling graphics tasks and compute tasks on a parallel processing unit such as, for example, a graphics processing unit (GPU), and even more particularly to scheduling graphics tasks and compute tasks for simultaneous execution on the same processing unit in a group of processing units of a parallel processing unit (such as, for example, a GPU).

BACKGROUND

One way to increase the performance of a processing system is to use parallel processing cores that can execute many instruction streams in parallel. Over the past several years, central processing units (CPU's) and graphics processing units (GPU's) have benefitted from such increased parallelism. For example, superscalar processors can dispatch multiple instructions to different execution units, thereby increasing average execution speed. Similarly, many modern GPU's have massively parallel processing architectures, meaning they contain many parallel processors that can operate on different parts of a graphics image in parallel.

In the past, GPU functions were limited to a well-defined set of graphics operations. This changed when GPUs became programmable. For example, in 2001, NVidia released its GEForce3 NV20 GPU providing programmable vertex and pixel shaders. Later, Nvidia developed the CUDA® parallel computing platform and programming model for general computing on graphical processing units (GPUs). With CUDA®, developers have been able to dramatically speed up computing applications by using GPU processing capabilities to perform computing tasks in addition to graphics tasks.

GPUs are typically specialized to process large blocks of data by processing, in parallel, a large number of threads related to a particular context. For example, the GPU may initially be allocated to a graphics context where all of the GPU threads are configured to process graphics data in parallel. When the GPU finishes rendering graphics, the CPU can switch the GPU to a different context and repurpose all of the GPU resources to compute (other than graphics) data processing.

As used herein, a GPU graphics context comprises the state related to executing instructions on the GPU for the processing of graphics data such as rendering 3D model data to generate 2D image data, processing textures, generating soft shadows, etc. A GPU compute context comprises the state related to executing instructions on the GPU to perform general parallel computations such as physics calculations used in animations or large data set analysis. Many conventional GPUs can be configured to process either a graphics context or a compute context, but not both at the same time. The operating system can dynamically switch the GPU from one context to another as needed during execution in order to process graphics tasks or compute tasks.

The capability to dynamically change the allocation of at least some processing capabilities between graphics tasks and compute tasks without requiring a context switch is desired for many applications, and can potentially improve the speed of processing of applications and also improve resource utilization. For example, in the course of processing graphics, the GPU may complete some graphics processing threads or warps while continuing to execute other graphics processing threads or warps. Requiring a context switch from graphics to compute before the GPU can execute compute threads or warps meanwhile would require the GPU to complete all graphics processing before it could allocate any processing resources to compute functions, thereby increasing latency and reducing processor utilization.

Some other GPUs enabled some of the processing units to be assigned for graphics processing and the other processing units to be assigned to compute processing, and allowed changing the proportion of allocation of the processing units between graphics and compute without switching contexts. See for example U.S. Pat. No. 9,626,216, which configured a GPU to execute first workload and second workload in accordance with the universal processing context, and transition from executing the first workload to executing the second workload without executing a context switch. These GPUs allowed simultaneously running graphics tasks on some of the processing units while the other processing units ran compute tasks. However, at least some such past commercial implementations may require draining of ongoing work from a GPU processing unit before that processing unit can be reallocated from graphics to compute—which may cause inefficiencies and delays. Moreover, the need to allocate resources at the processing unit level is often a further cause of inefficiencies.

There is a need for systems with scheduling techniques that can improve response times and/or processing resource utilization by allowing more flexible allocation of processors between graphics functions and compute functions, but without unduly compromising the GPU's ability to rapidly perform graphics processing.

SUMMARY

Example embodiments rectify some of the deficiencies of the techniques described above for sharing a GPU's processing resources between graphics and compute tasks.

Methods, computer readable mediums, and systems are disclosed for scheduling a streaming multiprocessor in a parallel processing unit to simultaneously execute at least one graphics warp and at least one compute warp in parallel.

An example embodiment provides a graphics processing unit including a streaming multiprocessor that executes parallel instruction streams and a scheduler connected to the stream processor. The scheduler schedules the streaming multiprocessor to simultaneously execute, in parallel, at least one graphics warp and at least one compute warp.

Another example embodiment provides parallel processing unit including a plurality of processing units, a hardware scheduler and a hardware arbiter. Each processing unit is configured to operate in a graphics-greedy mode or a compute-greedy mode at respective times, and to simultaneously run graphics work items from a graphics queue and compute work items from a compute queue. The hardware scheduler is configured to continuously select graphics work items from the graphics queue for running on a particular processing unit when the particular processing unit is configured to operate in the graphics-greedy mode, and to continuously select compute work items from the compute queue for running on the particular processing unit when the particular processing unit is configured to operate in the compute-greedy mode. The hardware arbiter is configured to, in response to a result of a comparison of at least one monitored performance or utilization metric to a user-configured threshold, selectively cause the particular processing unit to run one or more compute work items from the compute queue when the particular processing unit is configured to operate in the graphics-greedy mode, and to cause the particular processing unit to run one or more graphics work items from the graphics queue when the particular processing unit is configured to operate in the compute-greedy mode.

Another example embodiment provides a method for performing graphics work items and compute work items simultaneously on a parallel processor that has a plurality of processing units. The method includes receiving the graphics work items from a graphics pipeline and the compute work items from a compute pipeline, and scheduling a first group of said graphics work items and a second group of said compute work items to simultaneously execute on a selected single instruction multiple data (SIMD) or single instruction multiple thread (SIMT) processing unit of the plurality of processing units.

Another example embodiment provides a system including a CPU configured to execute an application, a memory configured to have a graphics queue and a compute queue, and a graphics processing unit. The graphics processing unit includes a plurality of processing units, a hardware scheduler and a hardware arbiter. Each processing unit is configured to operate in a graphics-greedy mode or a compute-greedy mode at respective times, and to simultaneously run graphics work items from a graphics queue and compute work items from a compute queue. The hardware scheduler is configured to continuously select graphics work items from the graphics queue for running on a particular processing unit when the particular processing unit is configured to operate in the graphics-greedy mode, and to continuously select compute work items from the compute queue for running on the particular processing unit when the particular processing unit is configured to operate in the compute-greedy mode. The hardware arbiter is configured to, in response to a result of a comparison of at least one monitored performance or utilization metric to a user-configured threshold, selectively cause the particular processing unit to run one or more compute work items from the compute queue when the particular processing unit is configured to operate in the graphics-greedy mode, and to cause the particular processing unit to run one or more graphics work items from the graphics queue when the particular processing unit is configured to operate in the compute-greedy mode.

DETAILED DESCRIPTION

Figure 1:
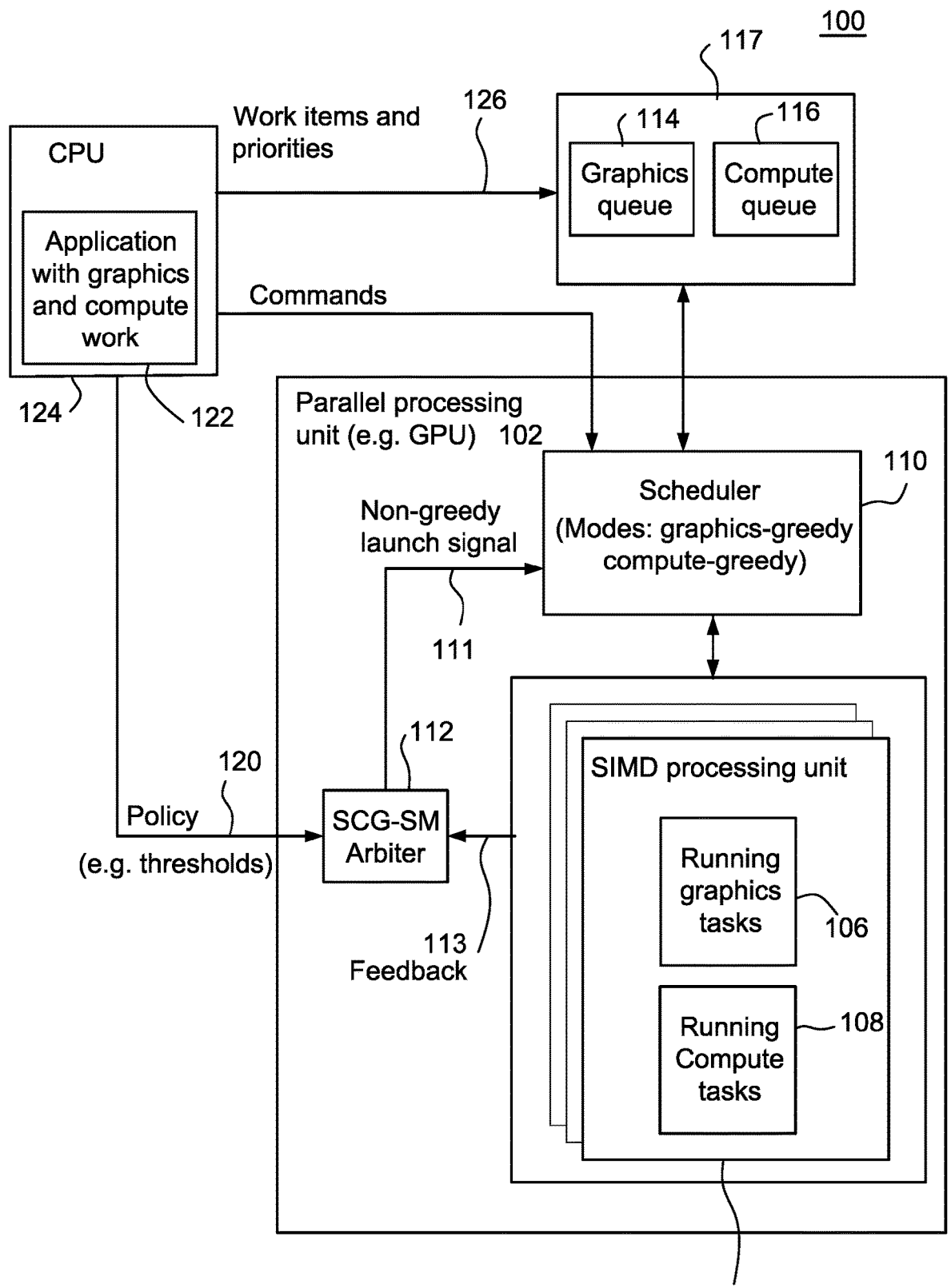
FIG. 1 illustrates a system in which graphics work items and compute work items can be simultaneously processed in one of a plurality of single instruction multiple data (SIMD) or single instruction multiple thread (SIMT) processing units of a parallel processing unit such as a GPU, according to some example embodiments.

Example embodiments eliminate some of the deficiencies of the techniques described above for sharing a GPU's processing resources between graphics and compute tasks. Example embodiments for example provide a hardware scheduler that can efficiently schedule independent queues of graphics and compute work on a parallel processing unit (e.g., a GPU) for simultaneous execution. Specifically, this hardware scheduler is configured to optimally use compute resources (e.g., streaming multiprocessors referred to as SM's) by making scheduling decisions at thread group granularity (e.g., warp granularity) based on software-specified scheduling controls and localized feedback from the execution units on how busy they are. Some example embodiments enable sharing a GPU processing unit such as an SM between a graphics pipeline and a compute pipeline by launching one or more graphics warps and one or more compute warps to execute simultaneously on the same SM, thereby sharing the SM between graphics and compute functions without requiring a context switch or completion of either type of function.

GPUs according to embodiments are configured to run graphics shaders (e.g., vertex, tessellation and geometry (VTG) shaders, pixel shaders, etc.) and compute shaders simultaneously on a single SM. A compute shader is a programmable shader stage that expands a conventional graphics application programming interfaces (API) such as for example Microsoft Direct3D 11 beyond graphics programming. This means warps from all work types can be run concurrently on the same SM and the warps can compete for SM resources such as register file space, internal stage buffer entry (ISBE) space, shared memory space, SM ALU resources, L1 cache bandwidth, crossbar switch bandwidth, frame buffer bandwidth, etc.

Embodiments provide for the GPU to schedule compute and graphics work at warp granularity, while also, providing for software to provide scheduling hints to the hardware scheduler in-line with work to fine tune performance across different buckets of work, enable setting compute priority vis-à-vis graphics priority per compute kernel launch, provide feedback from the execution units on the GPU to keep the scheduler informed when it is trying to make scheduling decisions, and enable balancing graphics work across the execution units to reduce under-utilization etc. due to the in-order nature of the graphics pipeline. Example embodiments use a hardware-implemented simultaneous compute and graphics arbiter (SCG-SM arbiter) to read in SM occupancy & utilization statistics or other metrics to decide on the time/space allocation percentage of the SM for graphics vs compute.

Previous GPUs, such as the GPU described in U.S. application Ser. No. 14/137,818, enabled a scheduler in hardware to adjust the ratio of graphics vs compute groups of SMs at runtime. However, software was required to make the determinations regarding the appropriate mix of groups of SMs and adjust it during the frame via compute methods as the work executes. However, the graphics and compute workloads in many practical scenarios are asynchronous and arrive at random times and with random alignment, making adjusting the scheduling via a compute method at runtime unpractical for software. Example embodiments may also improve over previous techniques in characteristics, such as, for example, hardcoded compute greedy policies not being flexible enough to dynamically react to different workloads, inability to not assign any resources to either compute, or to graphics (e.g., during z-only rendering or 2D draws), high latencies related to draining of SMs, and the high allocation granularity which is in terms of an entire SM, etc.

Advantages of the embodiments include improved execution speeds, improved resource utilization etc., due to the underlying support for dynamic allocation of individual processing units such as SMs between compute and graphics tasks. Among the many advantages of embodiments, improved support for asynchronous compute is also relevant with respect to conventional graphics APIs such as DirectX 12 (DX12) API which highly encourages creating asynchronous compute techniques in games. Simultaneous compute and graphics is a key feature of the DX12 API. The capability provided in example embodiments for graphics and compute to simultaneously run on the same SM, among other advantageous, also avoids the latency issues and the like that are found in previous approaches where, for example, a draining protocol was required to force all the graphics warps to complete before switching an SM to run compute warps.

System and Method for Simultaneous Execution of Compute and Graphics on an SM

Figure 3:
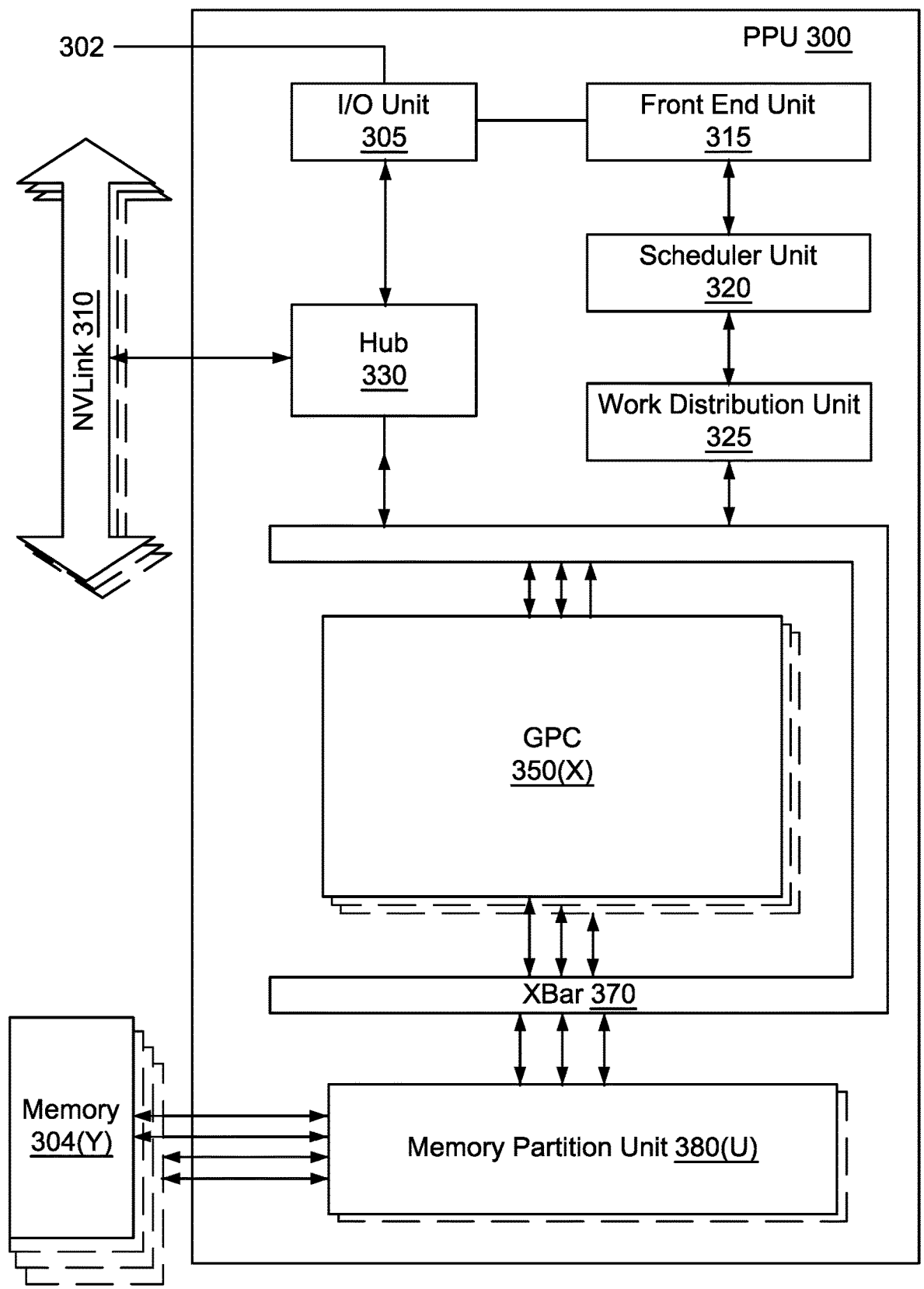
FIG. 3 illustrates a parallel processing unit, in accordance with an embodiment.
Figure 4A:
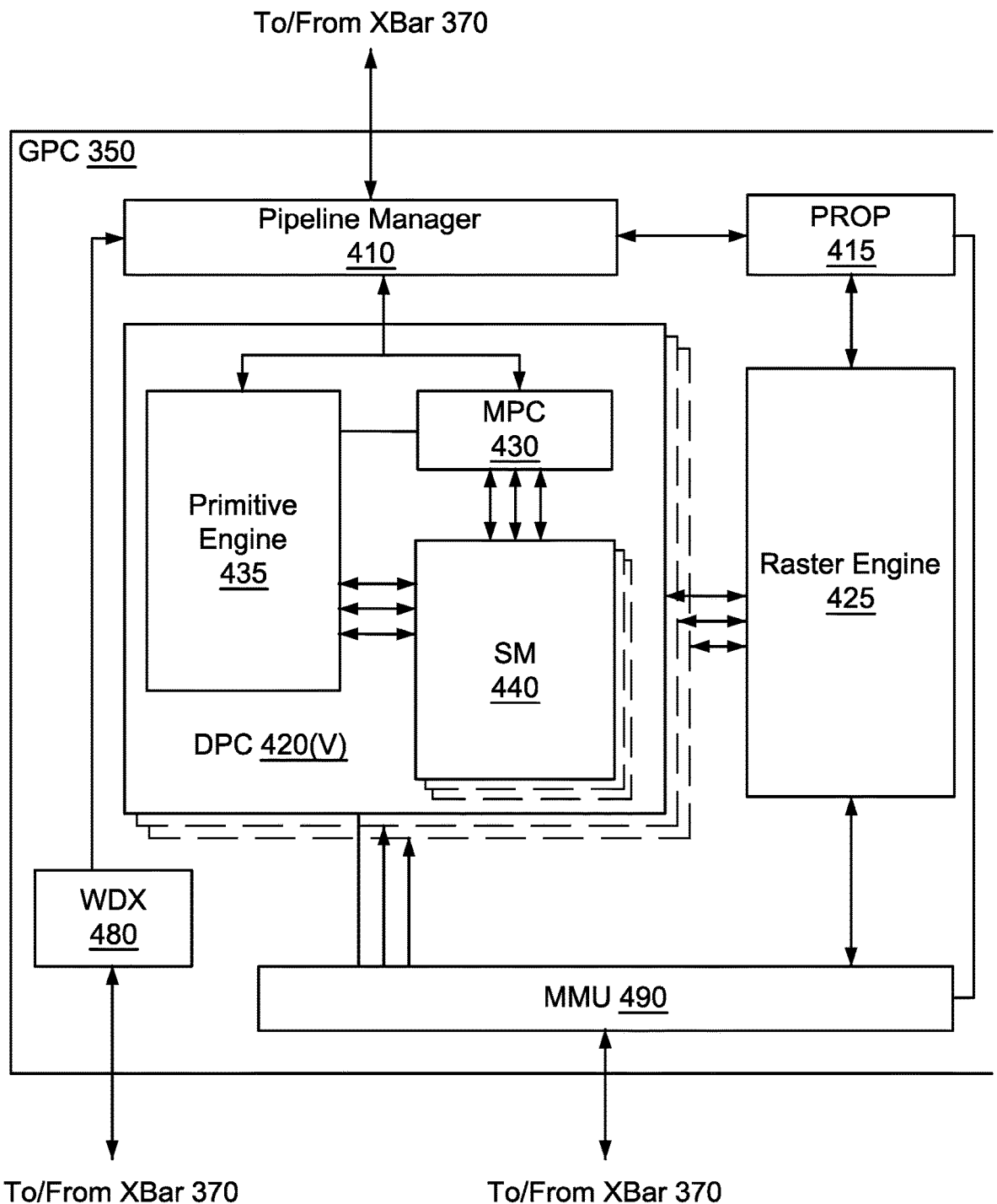
FIG. 4A illustrates a general processing cluster within the parallel processing unit of FIG. 3, in accordance with an embodiment.

FIG. 1 illustrates a system 100 in which graphics work items and compute work items can be simultaneously processed in one of a plurality of single instruction multiple data (SIMD) or single instruction multiple thread (SIMT) processing units of a parallel processing unit 102 such as a GPU according to some example embodiments. An example parallel processing unit is described below in relation to FIG. 3. In system 100, SIMD processing unit 104 is shown having a first set of one or more graphics tasks 106 and a second set of one or more compute tasks 108 executing simultaneously. This is in contrast to previous systems, such as, for example, the system described in the commonly-owned co-pending U.S. application Ser. No. 14/137,818 filed on Dec. 20, 2013, in which although a GPU may simultaneously process graphics tasks and compute tasks on separate processing units, such simultaneous execution was not in the same SIMD processing unit of the GPU. A "processing unit", as used in this disclosure, refers to a SIMD or SIMT processing unit such as, but not limited to, a streaming multiprocessor (SM) such as that described below in relation to FIG. 4A. As shown in FIGS. 3 and 4A, the example PPU 300 includes multiple SMs in each of its processing cores 350.

Figure 6:
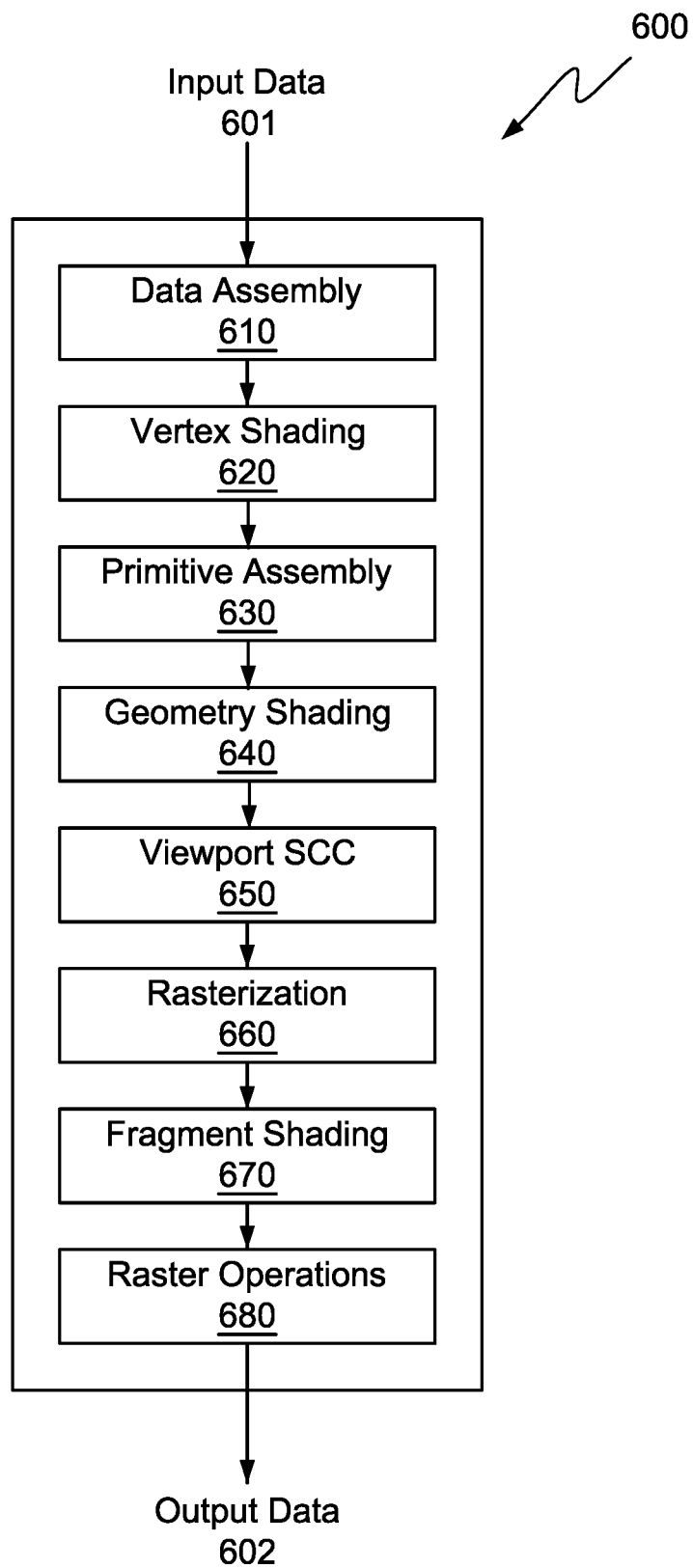
FIG. 6 is a conceptual diagram of a graphics processing pipeline implemented by the PPU of FIG. 3, in accordance with an embodiment.

The first set of graphics tasks 106 and the second set of compute tasks 108 are scheduled for simultaneous execution on the processing unit 104 by a hardware scheduler 110 that schedules tasks from a graphics queue 114 of graphics work items and a compute queue 116 of compute work items in a memory 117. The graphics work items in the graphics queue 114 may be enqueued by one or more graphics pipelines, and the compute work items in the compute queue 116 may be enqueued by one or more compute pipelines. A "graphics pipeline" (an example is shown in FIG. 6) is a set of logical stages in the processing of graphics data related to shading pixels for an image, with each stage capable of being separately scheduled in a pipelined manner. A "compute pipeline" is a set logical stages for processing data that is not directly related to shading pixels in an image. Example compute pipelines may include, but are not limited to, physics calculations associated with generating a model for an animation, analyzing large sets of data from the scientific or financial fields, etc.

The hardware scheduler 110 is configured to be operating in either a "graphics-greedy mode" in which it repeatedly extracts work items from the graphics queue 114 and launches to the processing unit 104, or in a "compute-greedy mode" in which it repeatedly extracts work items from the compute queue 116 and launches to the processing unit 104.

A hardware arbiter 112 operates to monitor performance and/or utilization of execution and storage resources associated with the processing unit 104, and to, while also considering user or software-defined configuration parameters for policies and/or task priorities, determine whether tasks of the current non-greedy type should be inserted for launch in between the repeated selection of tasks of the greedy type for execution in the processing unit 104. More specifically, hardware arbiter 112 continuously (or periodically at configurable periods) monitors 113 runtime statistics of a predetermined set of processing or storage resources to identify "holes" (e.g., excess unused capacity) in the current resource usage, that can be then used up (e.g., occupied) by launching some tasks of the non-greedy type. The holes can also be considered as "opportunities" to launch one or more tasks of the non-greedy type while the hardware scheduler 110 is operating in a particular greedy mode. The hardware arbiter 112 may provide a signal 111 to the hardware scheduler 110 informing it about any holes that were detected.

In example embodiments, each processing unit includes a hardware scheduler 110 and a hardware arbiter 112. For example, in FIG. 4A, each SM 440 may have an associated hardware scheduler 110 and an associated hardware arbiter 112 arranged within its data processing cluster (DPC).

The monitoring performed by the hardware arbiter 112 may be in accordance with policies 120 configured by an application 122 and/or driver software executed on a CPU 124. The policies 120 may set the type of hardware arbiter (e.g., type of SCG-SM arbiter), thresholds for determining holes in the current resource utilization, rates at which non-greedy tasks are to be launched upon detection of a hole, etc. The application 122 may be a computer game (e.g., also referred to as a video game) or other application that has both graphics requirements that enqueue work items to the graphics queue 114 and compute requirements that enqueuer work items to the compute queue 116. The application may transmit its work items 126 with associated task priorities to the memory 117 and its corresponding instructions 128 to the parallel processing unit (PPU) 102.

Figure 2A:
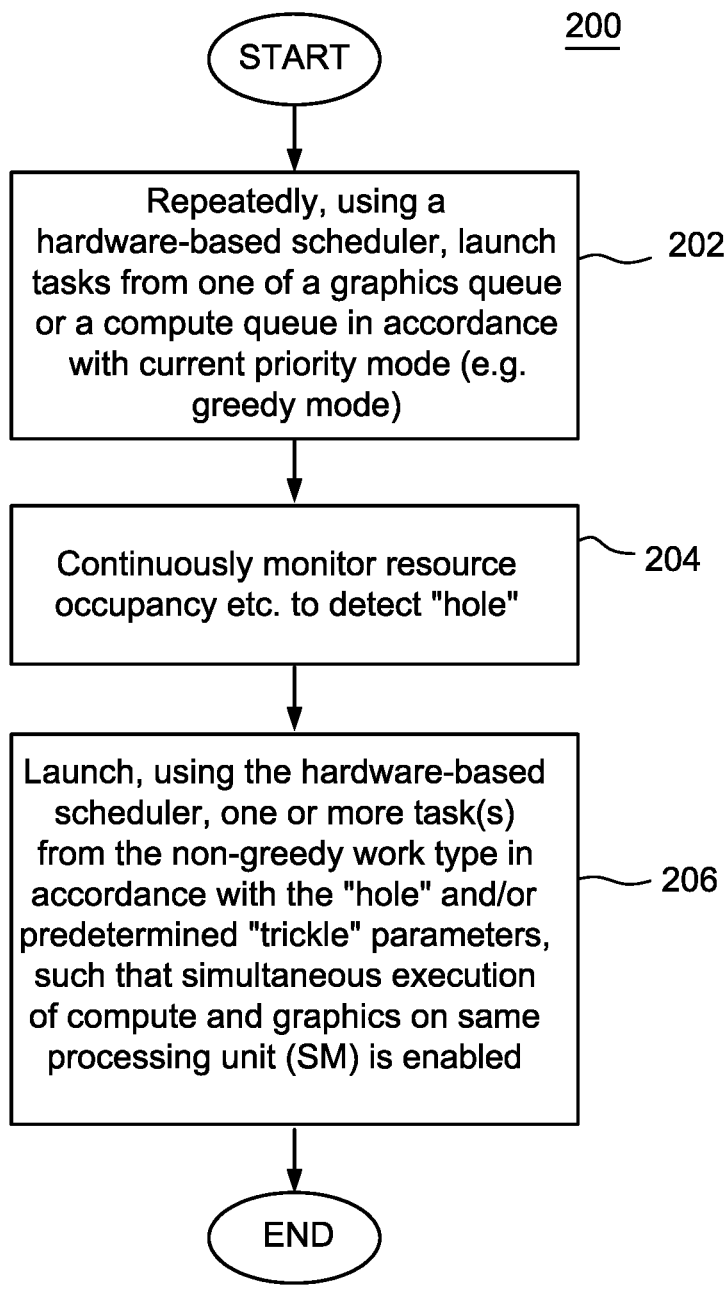
FIG. 2A illustrates a flowchart of a scheduling process according to some example embodiments.

FIG. 2A illustrates a flowchart of a scheduling process 200 according to some example embodiments. The scheduling process 200 may, for example, be performed in the PPU 102 by hardware units including hardware scheduler 110 and hardware arbiter 112 to dynamically schedule graphics tasks and compute tasks to execute simultaneously on the same SIMD processing unit 104.

After entering process 200, at operation 202, the hardware scheduler repeatedly launches work items from either a graphics queue or a compute queue in accordance with the current priority mode, for execution on a processing unit such as processing unit 104 (e.g., SM). For example, when in graphics-greedy mode, tasks from the graphics queue may be launched repeatedly, and when in compute-greedy mode, tasks from the compute queue may be launched repeatedly. The priority mode (e.g., graphics-greedy or compute-greedy) may be set in various ways. In some embodiments, the priority mode is based on the higher of the priorities of respective items in the graphics queue and the compute queue.

At operation 204, a "hole" in the current utilization of one or more resources may be detected as a result of monitoring of resources associated with the processing unit. The hole may be detected by comparing the current utilization (as represented by statistics averaged over a time interval) to one or more thresholds specified in a scheduling policy.

At operation 206, in response to the detection of a hole, the scheduler launches one or more work items from the queue for the current non-greedy priority. For example, while operating in the graphics-greedy mode, a detection of a hole may prompt the scheduler to launch some compute work items, or alternately, a hole detected while operating in the compute-greedy mode may prompt the scheduler to launch some graphics work items. The non-greedy priority work items launched may be determined in accordance with the resource availability indicated by the detected hole and/or a trickle rate specified in a currently active scheduling policy.

Thus, at operation 206, the processing unit may have graphics work items and compute work items executing on it concurrently, and competing for common resources.

Although method 200 is described in the context of a processing unit and certain hardware components, the method 200 may also be performed by custom circuitry, or by a combination of custom circuitry and a program. For example, the method 200 may be executed by a GPU (graphics processing unit) or any one or more processors capable of operations 202-206. Furthermore, persons of ordinary skill in the art will understand that any system that performs method 200 is within the scope and spirit of embodiments of the present invention.

Example Warp Workload Distribution

Figure 2B:
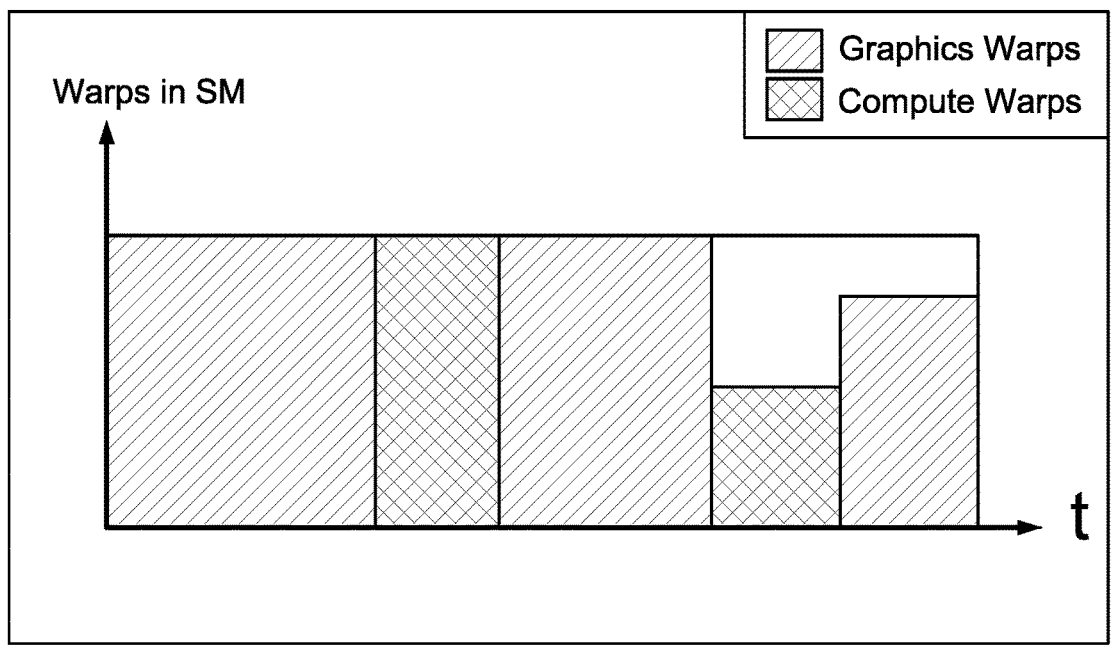
FIG. 2B shows an example warp-level view of the work on a processing unit according to a conventional technique.

FIG. 2B illustrates an example workload comprising graphics and compute on one processing unit in a conventional GPU. As illustrated, at any given time, only a single type of warps can occupy the processing unit. As illustrated, the processing unit executes a sequence comprising a full complement of graphics warps, followed by a full complement of compute warps, and again a full complement of graphics warps. The sequence then continues with only a portion of the compute tasks being scheduled, with some of the processing unit's capacity being unused.

Figure 2C:
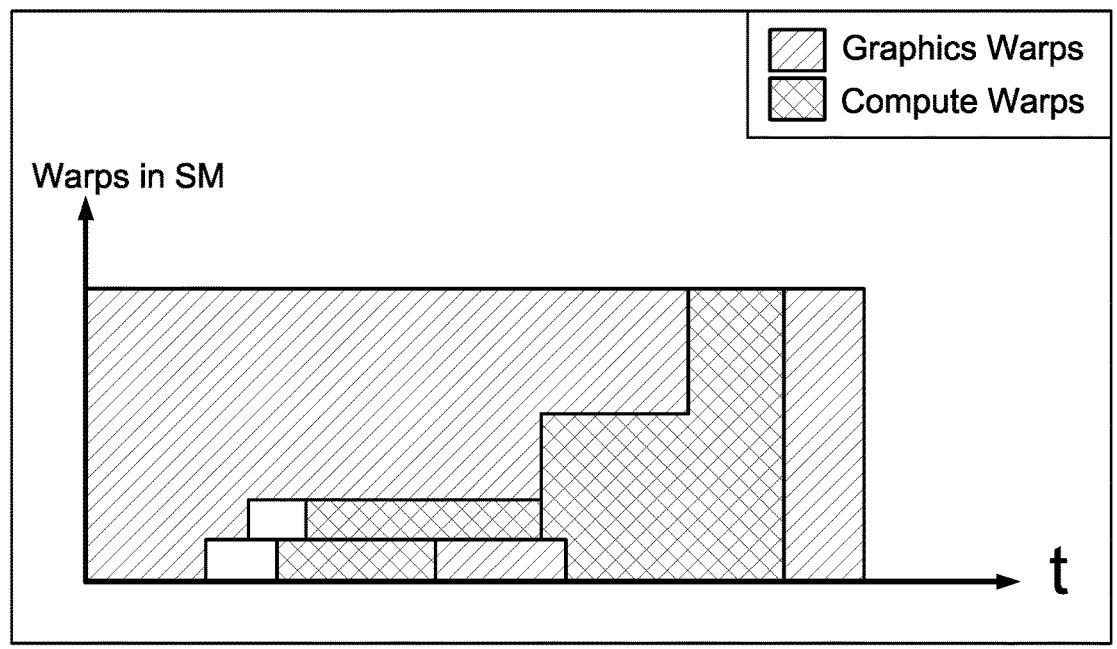
FIG. 2C shows an example warp-level view of the work on a processing unit (e.g., a single streaming multiprocessor) of a GPU according to some example embodiments.

FIG. 2C provides an illustrative warp allocation to a processing unit over time, according to certain example embodiments. For example, the processing unit may be capable of having a plurality (e.g., 32) of concurrent warps. FIG. 2C illustrates the processing unit initially operating in a graphics-greedy mode, then briefly in a compute-greedy mode, and again in the graphics-greedy mode. It also illustrates that during the graphics-greedy portions, at certain times such as, for example, when holes (underutilization) are detected, a small number of compute warps were scheduled on the processing unit. The areas in the graph where no fill pattern exists, may indicate that the holes in the workload are detected after a small lapse of time (for example, due to the averaging of statistics over time). The area where more than half the workload are compute warps, may represent a compute-greedy period, with a substantial number of graphics warps.

A comparison of FIGS. 2B and 2C illustrates that a better utilization of the processing unit capacity in FIG. 2C representing that the processing unit is shared, and also illustrates that at least some warps of the non-greedy type can launch while a particular greedy mode is active.

An analogy may be illustrative of at least some aspects of an example embodiment. A police officer manually directing traffic at an intersection where cars in two inbound roads are vying to get on a single outbound road may be like the hardware scheduler scheduling work on a particular processing unit from two work queues. The first inbound lane has all the important cars and they are allowed by the police officer to go into the outbound road as soon as possible. During particularly busy periods in which the first inbound road is filled in multiple lanes, the police officer may have an assistant that has a better vantage point for observing the traffic level. The assistant, like the hardware arbiter in example embodiments, may occasionally, upon observing a lull in the traffic, signal the police officer, who in turn, quickly allows one or other small number of cars from the second inbound road into the outbound road. Thus, in a manner similar to how a particular processing unit operating in graphics-greedy mode is shared between concurrent graphics and compute warps, the outbound road is shared between the cars from the first and second inbound roads.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
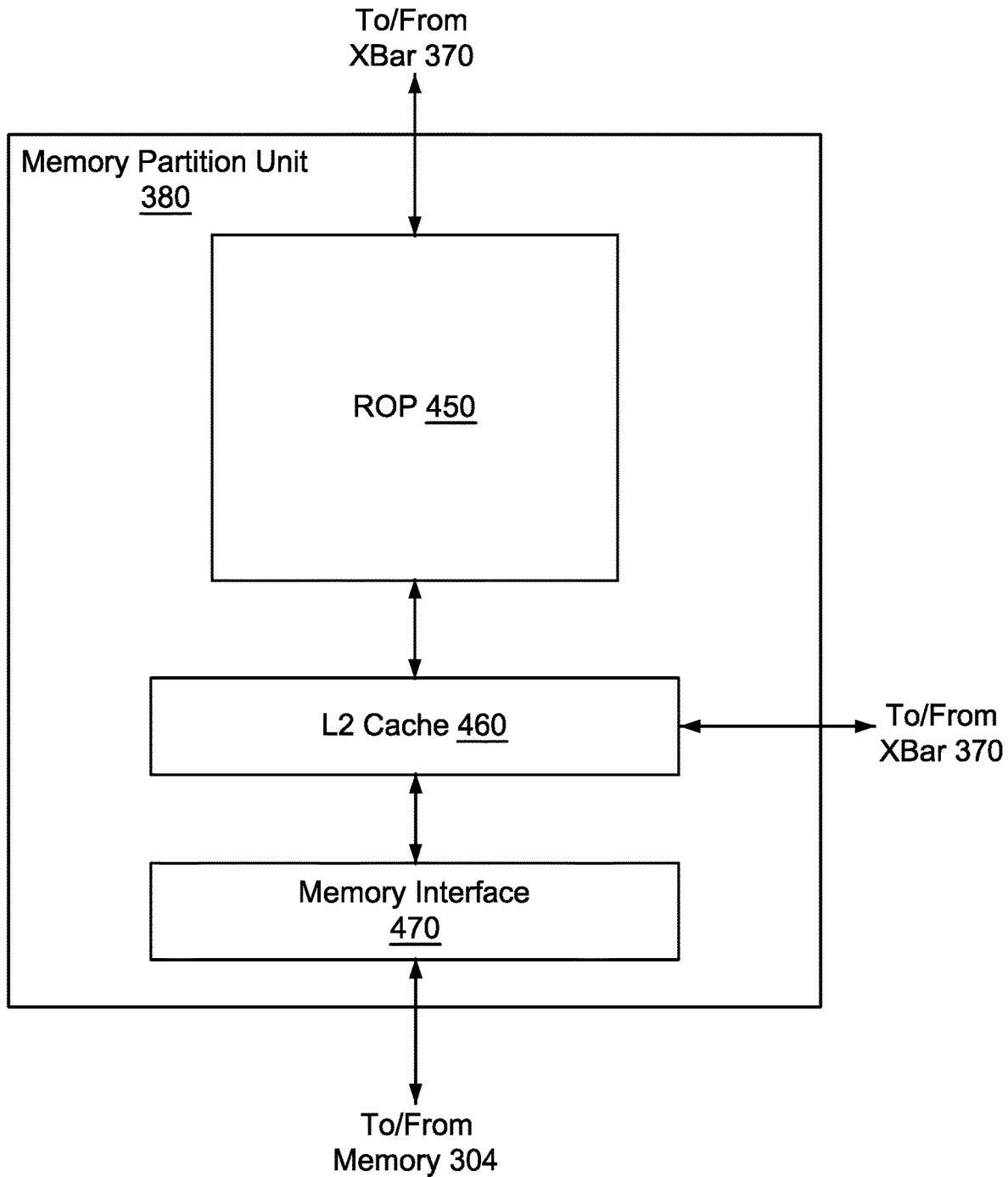
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
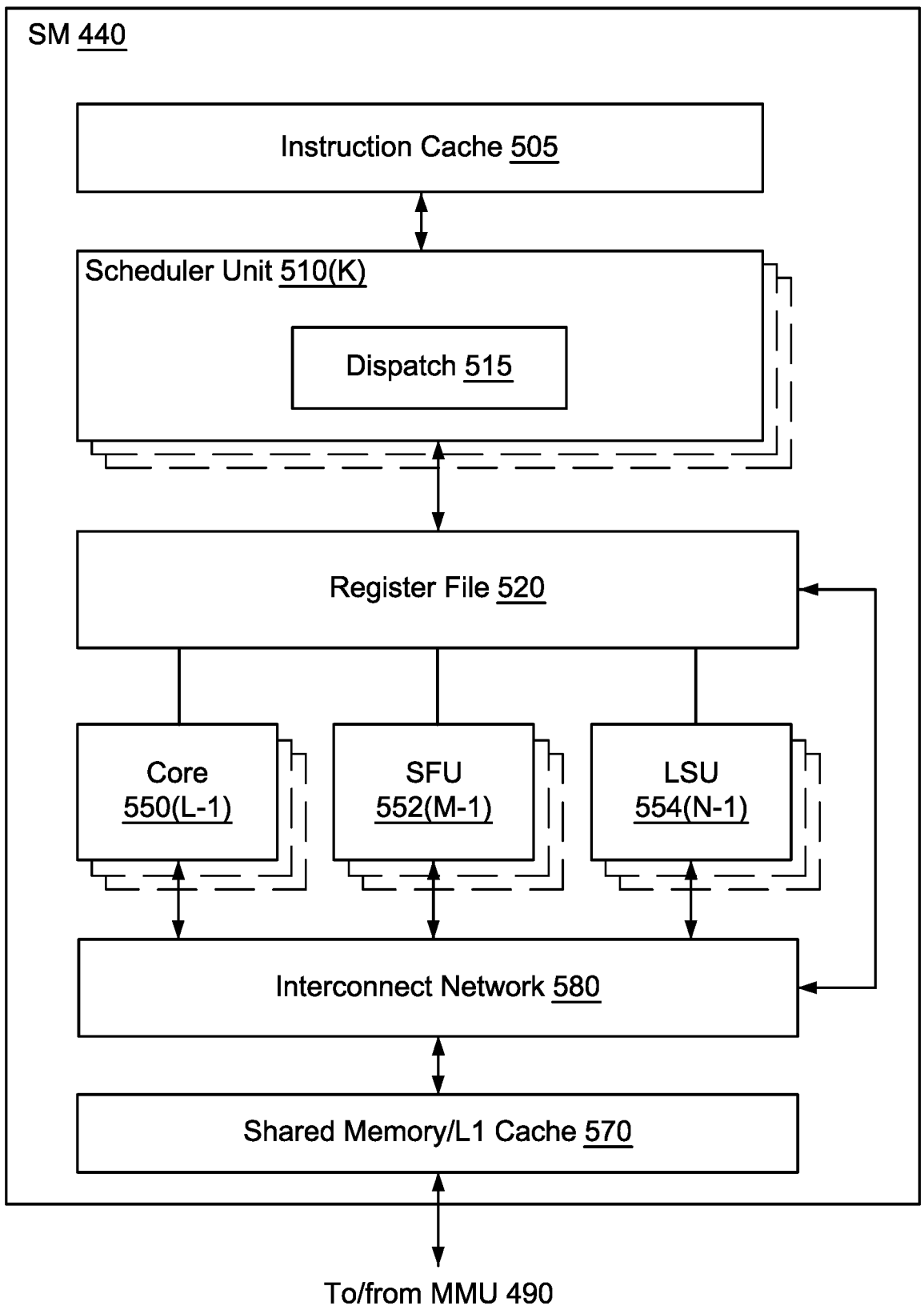
FIG. 5A illustrates the streaming multiprocessor of FIG. 4A, in accordance with an embodiment.

FIG. 5A illustrates the streaming multiprocessor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Figure 5B:
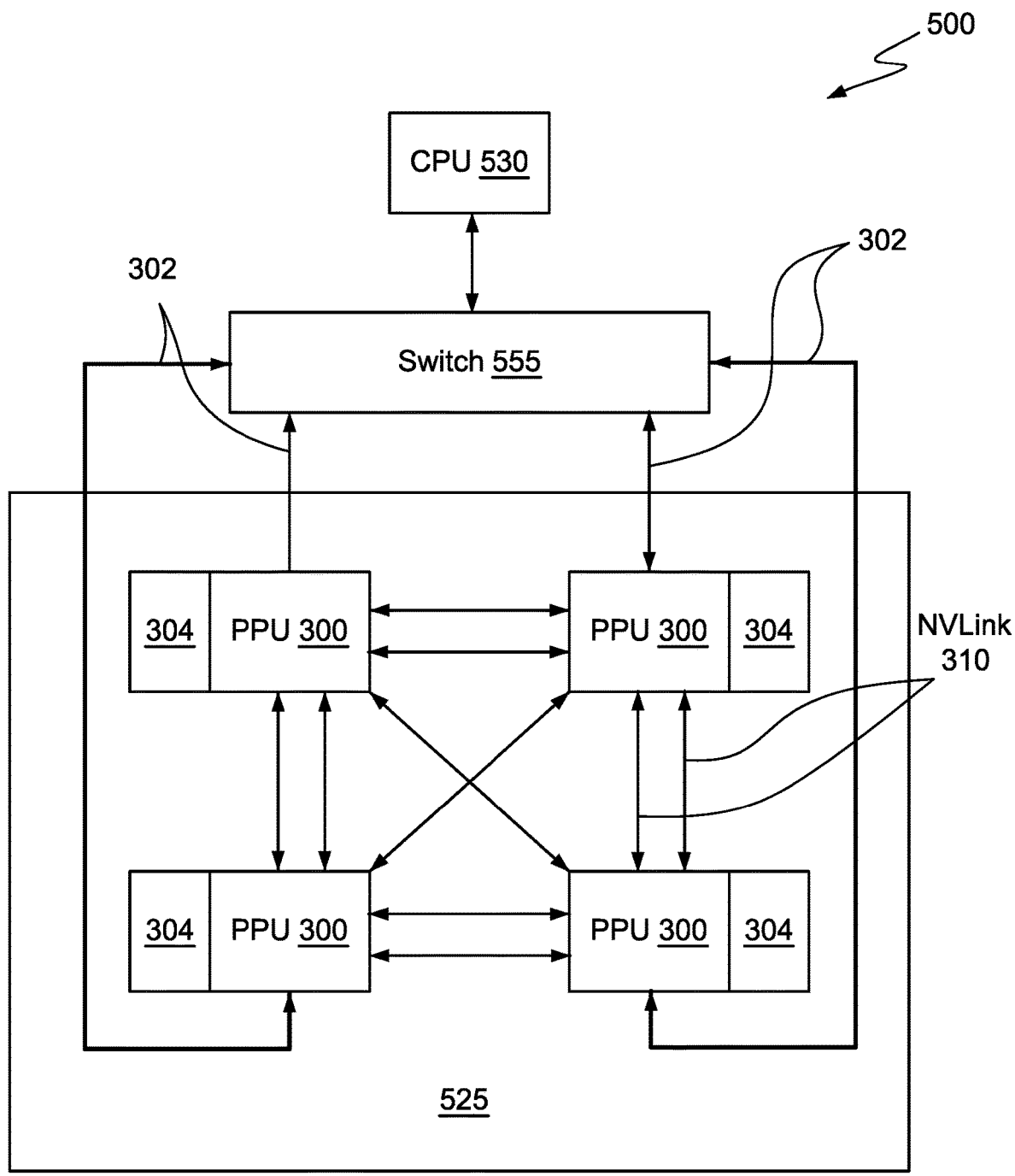
FIG. 5B is a conceptual diagram of a processing system implemented using the parallel processing unit (PPU) of FIG. 3, in accordance with an embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 5B is a conceptual diagram of a processing system 500 implemented using the PPU 300 of FIG. 3, in accordance with an embodiment. The exemplary system 500 may be configured to implement the method 200 shown in FIG. 2A. The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
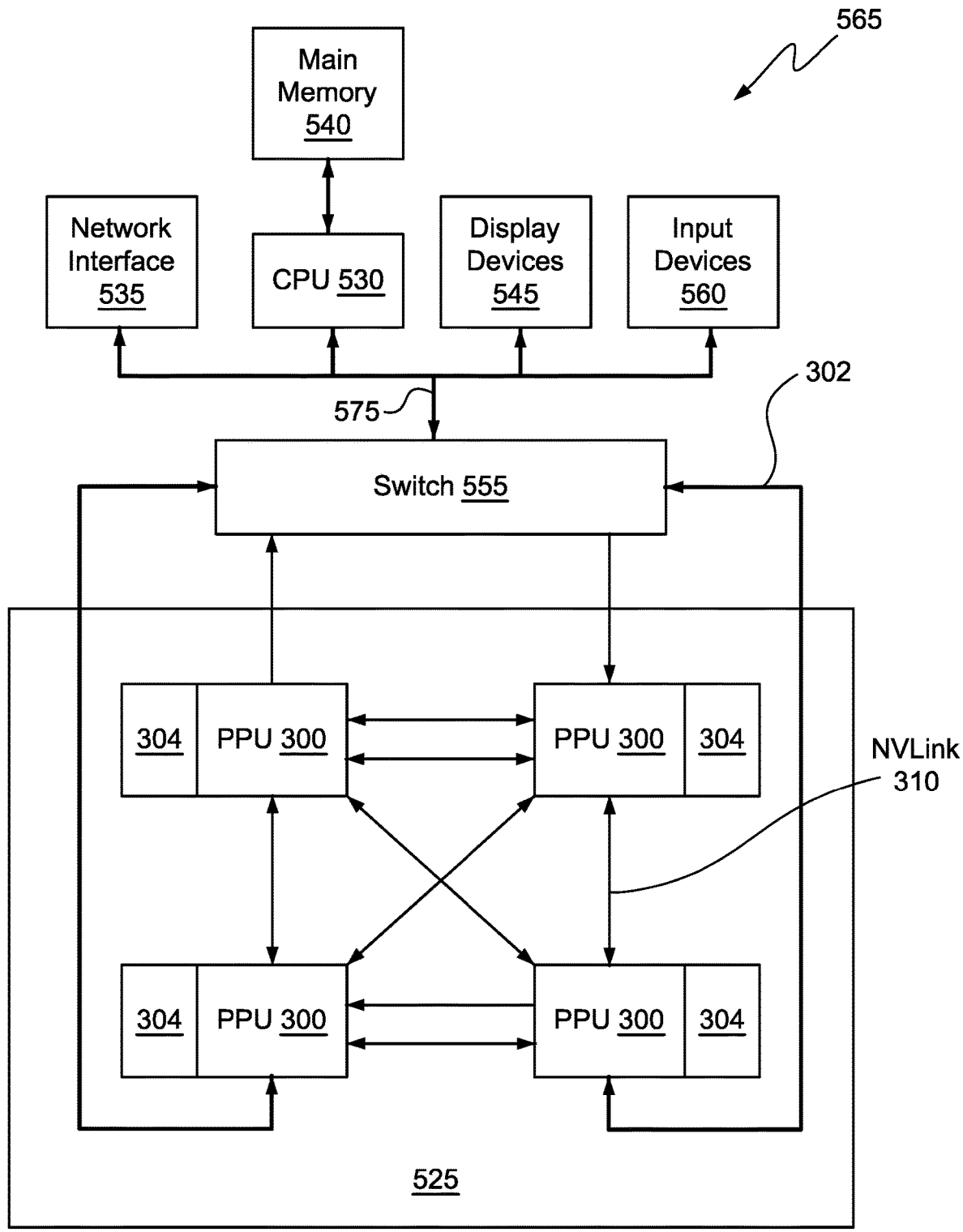
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 200 shown in FIG. 2.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Simultaneous Compute and Graphics on SM with Non-Balanced Arbiter

Figure 7:
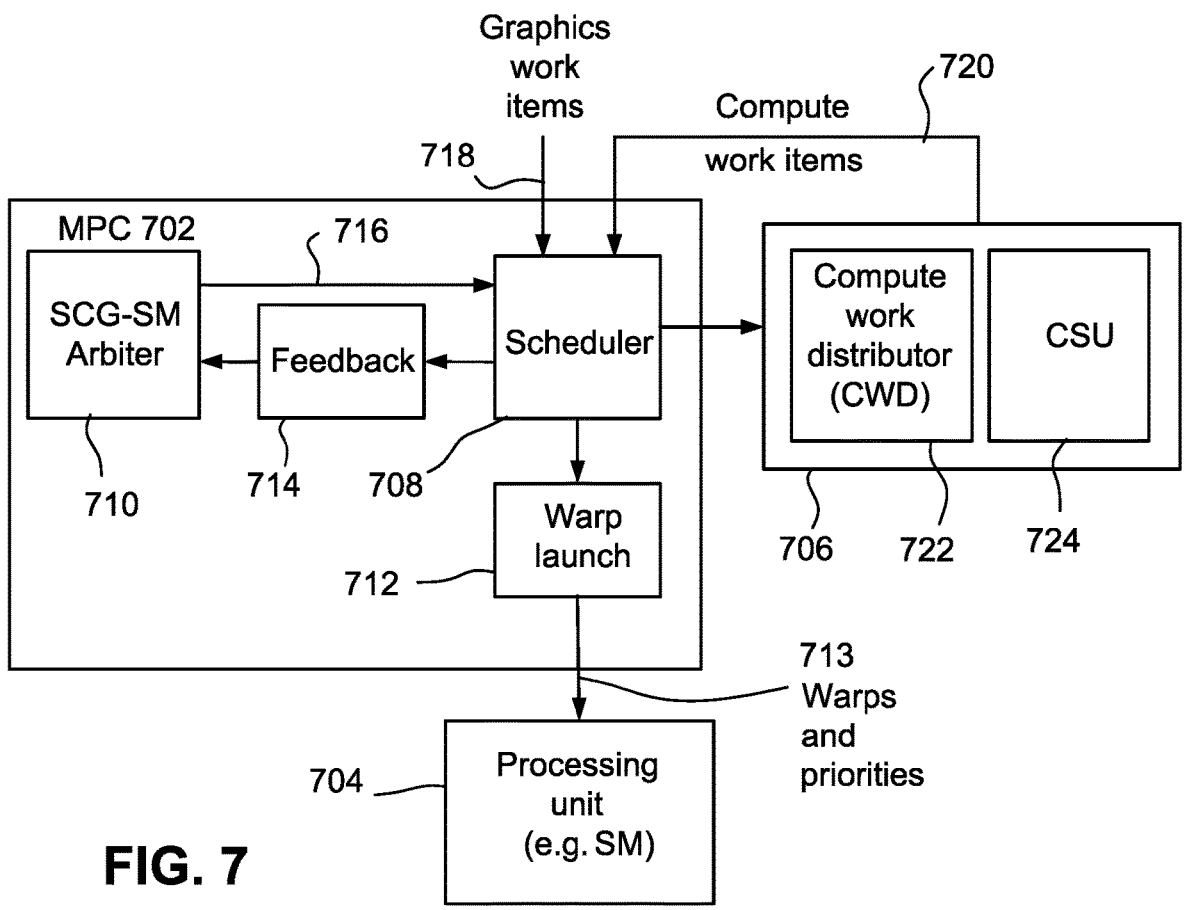
FIG. 7 schematically illustrates further details of the scheduler and arbiter described in relation to FIG. 1 and FIG. 2, according to some example embodiments.

FIG. 7 schematically illustrates further details of the hardware scheduler and hardware arbiter described in relation to FIG. 1 and FIG. 2, according to some example embodiments. More particularly, FIG. 7 illustrates an MPC 702 of a PPU (e.g., PPU 102) and a scheduler and arbiter implemented in the MPC 702. In the embodiment illustrates in FIG. 7, the hardware scheduler 708 and hardware arbiter 710 are located in the MPC 702 associated with SM 704. In some embodiments, one or both or scheduler 708 and arbiter 710 are implemented outside the MPC 702, but within the same DPC as the SM 704. The physical proximity of the arbiter 710 to SM 704 facilitates fast reaction times necessary to effectively perform trickling of non-greedy work to the SM. The physical proximity also improves the accuracy of feedback received regarding SM utilization.

Scheduler 708 and arbiter 710 may correspond to implementations of scheduler 110 and arbiter 112 respectively according to some embodiments. According to some embodiments, the scheduler 708 and arbiter 710 operate in a DPC-level arbiter mode which is "non-balanced" in that each MPC makes decisions independently based on local information from its DPC (DPC and MPC are described in relation to FIG. 4A).

Scheduler 708 operates to repeatedly schedule groups of threads via warp launch block 712 to execute on SM 704. The warp information 713 provided by the warp launch block 712 to the SM 704 may include warp priority information that may be used by the SM in scheduling instructions. The groups of threads comprise graphics work items 718 from a graphics queue or compute work items 720 from a compute queue, and are obtained by the scheduler 708 in accordance with the current priority mode (e.g., graphics-greedy mode or compute-greedy mode). Each group of threads may be a group of 32 threads, which, as described before, may be referred to as a warp. Since, according to some embodiments, an SM can simultaneously run 32 warps (each having 32 threads), the scheduler may assign compute warps and graphics warps in different proportions to simultaneously execute on a particular SM.

Arbiter 710 operates to monitor a predetermined set of resource utilization metrics in view of one or more policy-controlled thresholds and, by providing a signal 716, to cause the scheduler 708 which is currently operating in a particular greedy mode to schedule some work items from the non-greedy work queue.

The feedback block 714 may implement the monitoring of the predetermined set of resource utilization in accordance with a set of thresholds specified by policy.

In some embodiments, the manner in which the scheduler 708 obtains graphics work items may be different from how it received compute work items. In the schematic illustration of FIG. 7, the scheduler 708 may directly (or through the front end unit (not shown)) obtain graphics work items from a graphics queue, but is required to request a compute work distribution unit 706 for compute work items. The compute work distribution unit 706 may include a compute work distributor (CWD) 722 and a compute scheduling unit (CSU) 724 that perform distribution and scheduling respectively of compute work items among multiple SMs.

Figure 8:
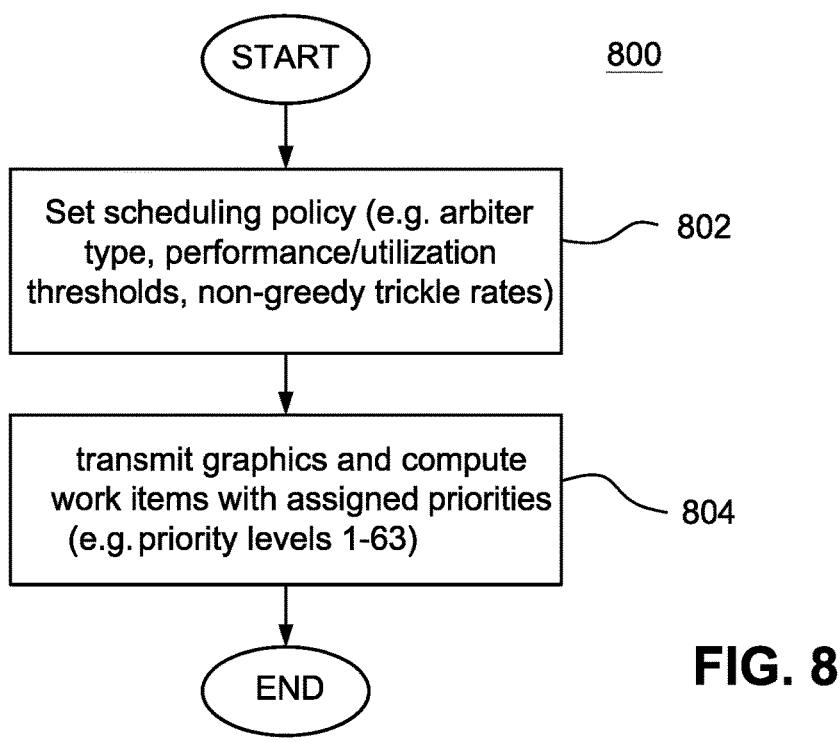
FIG. 8 illustrates a process by which an application can configure the scheduling policy in order to control some aspects of how a GPU (or other type of PPU) schedules its graphics work items and its compute work items.

FIG. 8 illustrates a process 800 by which an application can configure the scheduling policy in order to control some aspects of how a GPU (or other type of PPU) schedules its graphics work items and its compute work items. Process 800 may, for example, be performed by an application such as application 122 (e.g., a game, an application including a physics simulation, other application using an API such as DX12, etc.) executing on CPU 124.

After entering process 800, at operation 802, the application may set a scheduling policy. The scheduling policy may include configurations for selecting an arbiter from a plurality of arbiters available in the system, one or more performance metrics and/or resource utilization/occupancy thresholds for use in detecting "holes" of unused resource capacity for each of the graphics-greedy mode and compute-greedy mode of operation, trickle rates at which non-greedy work items can be introduced, etc.

Parameters that can be configured as contents of a policy may include separate sets of parameters for graphics and for compute. The parameters are configured according to the characteristics of each resource and type of work. For example, while it may be helpful to factor in whether the graphics work is output stalled as a performance and/or resource utilization metric, since, at least in some embodiments, the compute is output to shared memory, it may be of no added benefit to monitor output stalling for compute. In contrast to compute that is output to shared memory, the SM may use one or more fixed function acceleration units for graphics work. Factoring in stalling at the SM due to back pressure from these fixed-function units in the output stalling metrics for graphics enables the hardware scheduler to schedule compute without scheduling more graphics in situations where the fixed-function units associated with the SM are already backed up.

The graphics-related policy parameters set as thresholds may include, but are not limited to: an input starving threshold value(s) which specify the threshold below which the arbiter may consider a particular input pipeline to be starving the SM (this parameter may be specified separately for each of the alpha pipeline, beta pipeline and the pixel pipeline (e.g., INPUT_STARVED_ALPHA, INPUT_STARVED_BETA, INPUT_STARVED_PIX, respectively); each metric may be calculated as an integral of a binary output checking if the particular type of work is available in the input queue over the averaging window); output stalling threshold value(s) which specify the threshold above which the arbiter may consider a particular output destination to be stalling the SM because the output cannot consume as fast as the SM is producing (this parameter may be specified separately for each of the alpha pipeline, beta pipeline which both output to ISBE memory, and the pixel pipeline which outputs to PROP/GPM (e.g., PE_ALPHA_OUT_STALL, PE_BETA_OUT_STALL, GPM_PIX_OUT_STALL, respectively); may be calculated as a ratio between the amount of ISBE waiting for copy out to the amount of ISBE allocated and still being used by live warps or as a ratio between the pixel registers already computed but waiting for drain to the pixel registers still being used by pixel warps); a graphics warp occupancy threshold representing the graphics greediness threshold (e.g., GFX_WARP_OCCUPANCY) for warp resources above which the arbiter may decide to launch compute; a graphics register file occupancy threshold (e.g., GFX_RF_OCCUPANCY) representing the graphics greediness threshold for register file resource above which the arbiter may decide to launch compute; and a graphics ISBE occupancy threshold (e.g., GFX_ISBE_OCCUPANCY) representing the graphics greediness threshold for ISBE above which the arbiter may decide to launch compute. Each of the occupancies may be calculated as an integral of the instantaneous compute warp occupancy for a DPC over a configurable averaging window.

The graphics-related policy parameters also include a graphics priority specifying the priority level for the graphics work (this is with respect to the compute priority set by the driver inside each compute work item data structure), and the number of subtiles or other specified quantity of work to reserve in MPC when graphics is granted by arbiter when in compute greedy mode. The default is set at a small value such as, for example, 1 in order to let graphics just trickle in while in compute greedy mode.

The compute-related policy parameters set as thresholds may include, but are not limited to: an input starving compute threshold (e.g., INPUT_STARVED_COMP) at which the arbiter may consider that compute is starving the SM (may be calculated as an integral of a binary output checking if a task sync is pending without a nack over the averaging window); a compute warp occupancy threshold (e.g., COMP_WARP_OCCUPANCY) indicating the compute greediness occupancy threshold above which the arbiter may decide to launch graphics; a compute register file occupancy threshold (e.g., COMP_RF_OCCUPANCY) indicating the compute greediness occupancy threshold for register file resource above which the arbiter may decide to launch graphics; and a compute shared memory occupancy threshold (e.g., COMP_SHM_OCCUPANCY) representing the compute greediness occupancy threshold for shared memory resource above which the arbiter may decide to launch graphics.

The compute-related policy parameters also include a compute priority which represents the priority level to be set for compute work (e.g., this is the priority set by the driver inside each compute work item data structure (e.g., referred to sometimes as "QMD")), and a compute MPC resource reserve parameter representing the number of CTAs ("cooperative thread array" (also cooperative group above) or other quantity of compute work) to reserve in MPC when compute is granted by arbiter when in graphics greedy mode. The default is set at a small value such as, for example, 1 in order let compute just trickle in while in graphics greedy mode.

In some embodiments the policy parameters may also include a size of the averaging window which defines the window duration over which averaging is done by MPC for SCG-SM arbiter input statistics. MPC may implement a sliding window average for the statistics being provided to SCG-SM arbiter. In some embodiments, this window may be implemented as a total number of samples instead of a time window. The policy parameters may also include a sample duration which defines the sampling rate for the integral for the window.

At operation 804, the application may transmit instructions and work items, in streams of one or more graphics work items and/or one or more compute work items to the GPU. The work items may be enqueued as appropriate in a graphics queue and a compute queue that are accessed by the GPU. The instructions associated with the work items may be transmitted to the GPU.

The transmission of graphics work items and compute work items may continue throughout the application's execution on the CPU, and may cause graphics to be rendered on a di splay of the system.

Figure 9:
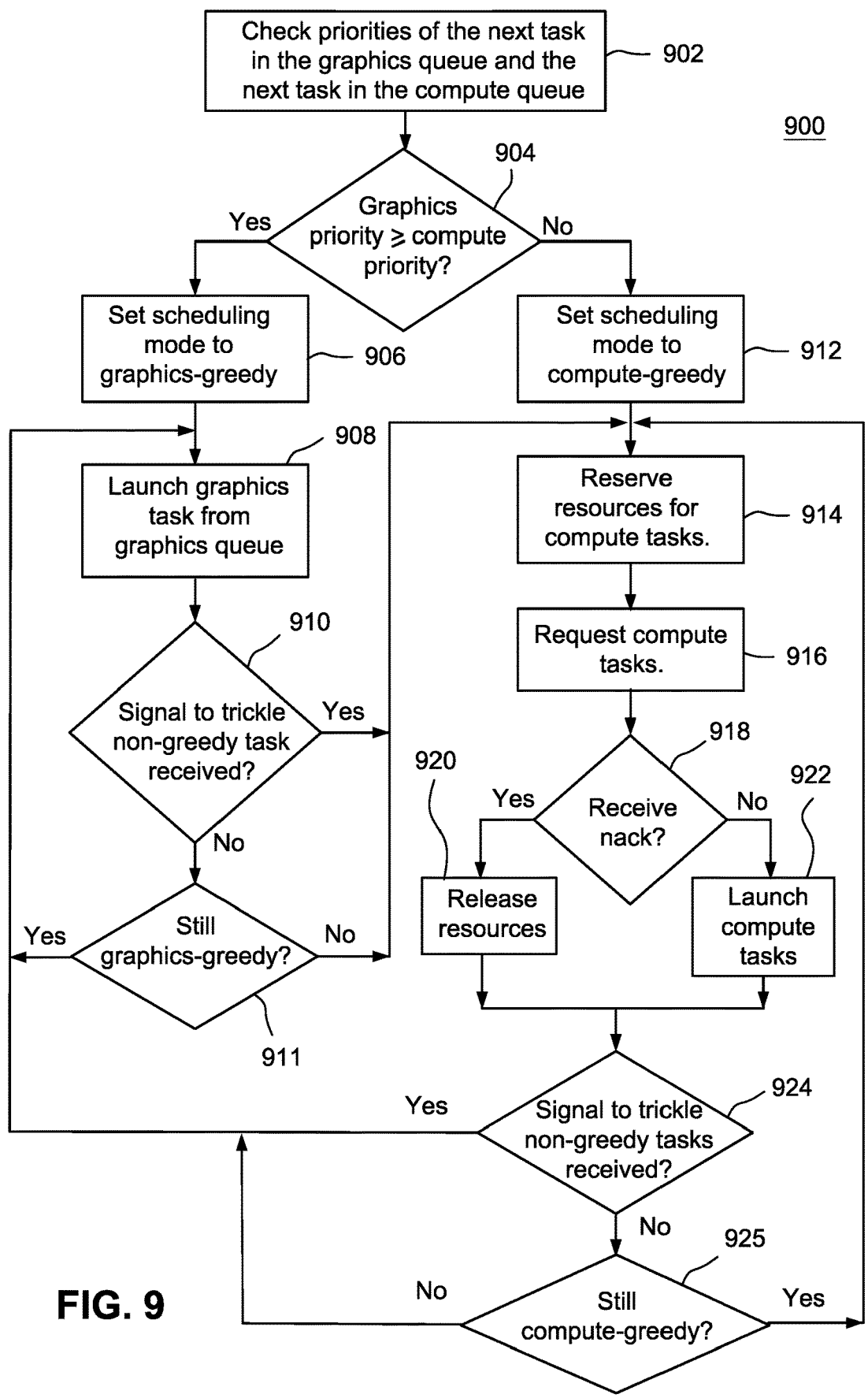
FIG. 9 shows a flowchart of a process that may be performed by a scheduler, such as the scheduler, according to some example embodiments.

FIG. 9 shows a flowchart of a process 900 that may be performed by a hardware scheduler, such as, for example, the scheduler 708, according to some example embodiments.

After entering process 900, at operations 902-904, the scheduler determines the current priority mode of the GPU. The higher of the priorities associated with the next work item in the graphics queue and the next item in the compute queue may be used to determine the current priority mode. For example, if the next work item in the graphics queue has a higher priority than the next item in the compute work queue, then the current priority mode is set to graphics-greedy mode. Alternatively, if the next item in the compute queue has a higher priority than that in the graphics queue, then the GPU is set to the compute-greedy mode.

The priorities for the work items may be set by the application on the same scale for both graphics work items and compute work items so that they can be compared to each other. In some example embodiments, each graphics work item and each compute work item is associated with a priority value in the scale 1-63. According to some embodiments, the priority of graphics work items can be set inline with the instruction stream, and the priority of compute work items may be set in the work items themselves.

In some embodiments, the graphics priority may be specified by the application or a driver in an inline graphics command. The graphics command setting priority may be sampled at the top of the pixel pipe so that it stays strictly in order with all prior pixel work (but not strictly in order with subsequent vertex work). The compute priority may be determined from a field in the compute work item for the current grid being distributed by CWD.

At operation 902, the scheduler detects the priorities of the next items in each of the graphics queue and the compute queue, and at operation 904, makes a determination as to which priority is higher.

If the graphics priority is determined to be higher or equal, then at operation 906, the scheduler is set to operate in the graphics-greedy mode. Operating in the graphics-greedy mode involves repeatedly launching graphics work items from the graphics queue, while considering mostly the graphics statistics to decide when to allow a little more compute work to be scheduled.

While in graphics-greedy mode, at operation 908, the scheduler repeatedly selects the next item from the graphics queue and launches it for execution on the associated SM. Operation 908 is repeated until either the graphics queue is empty, the scheduler transitions out of the graphics-greedy mode, or a signal is received to launch one or more non-greedy work items. As described above, such a signal to "trickle" some non-greedy work items, which in this instance are compute work items, may be generated by a hardware arbiter such as arbiter 710. At operation 910, it is determined whether a signal (e.g., a compute launch command) has been received from the arbiter to trickle non-greedy (in this instance, compute work items). If yes, process 900 proceeds to operation 914 to launch one or more compute work items. The number of work items launched when trickling in compute work while in graphics-greedy mode may be based on policy parameter (e.g. the number of CTAs specified by a COMP_MPC_RESOURCE_RESERVE parameter, which is typically set to 1 so that MPC will launch only 1 CTA for each compute launch command from the SCG-SM arbiter).

If no, at operation 911 it is determined whether the scheduler is still in the graphics-greedy mode. If the scheduler is still in graphics-greedy mode, then process 900 proceeds to operation 908 to launch more graphics work items. If the scheduler is no longer in the graphics-greedy mode, then, for example, process 900 may proceed to operation 914 to continue processing in the compute-greedy mode.

If at operation 904, a determination is made that the compute priority is greater than the graphics priority, then at operation 912, the scheduler is set to operate in the compute-greedy mode. Operating in the compute-greedy mode involves repeatedly launching compute work items from the compute queue, while considering mostly the compute statistics to decide when to allow a little more graphics work to be scheduled.

Changing from a graphics-greedy mode to a compute-greedy mode may involve certain steps. If the change is caused by high task priority due to a task sync by CWD, then the MPC may flush the VTG work which have allocated register file space, warps and ISBE memory, flush the pixel work already allocated resources and then switch to compute-greedy. Note that it may not be required to flush the entire graphics input pipe. Alternatively, if the change is caused by lowering of graphics priority in the graphics pipe, then all graphics inputs prior to the priority setting may be flushed by MPC before switching the greedy mode to compute from graphics.

In some embodiments, the compute work items may be obtained from the compute queue and launched in the same manner as graphics work items. However, in the embodiments illustrated in FIG. 7, compute work items are scheduled by the scheduler in a manner different from that for graphics work items. In the illustrated embodiments, after determining to launch compute work items, the scheduler, at operation 914, reserves resources for the compute work items to be launched, and at operation 916, the scheduler requests compute tasks.

In certain example embodiments, the scheduler (or other component in the MPC) requests compute work items from the CWD. The scheduler can request a specific number of CTAs whenever it wants (e.g. at task sync, when SCG-SM arbiter decision changes, or when a CTA completes). CWD will either launch those CTAs or respond with CTA launch Nack to MPC. CWD will rasterize CTAs if it has more to send. CWD will send CTA launch Nacks when it can't launch the CTAs requested by MPC, if in ComputeInGraphics mode (i.e., "ComputeInGraphics" refers to requesting trickle of compute while in graphics-greedy mode). Once MPC requests CTAs, resources in SM are reserved and there is a guarantee that any CTA launched by CWD will be quickly loaded onto the SM. In ComputeInGraphics mode, the MPC can request CTAs asynchronously based on the SCG-SM arbiter.

The CWD to MPC protocol conceptually makes the MPC the master and lets MPC request CTAs from CWD. In the ComputeInGraphics mode, the protocol allows the SCG-SM arbiter (either localized to MPC or in GPM) to launch CTAs whenever it decides to, without the need for a local CTA queue inside the MPC. With the protocol when in ComputeInGraphics mode, CWD may load-balance across SMs based on the CTA requests from MPC which already takes into account the resources occupied by graphics running on those TPCs.

With the CWD to MPC protocol, MPC can request CTA launches from CWD three ways: with a CTA report packet at task sync time, with a CTA complete packet when a prior CTA completes on the SM, or with a new CTA request packet such as when the SCG arbiter tells MPC to devote more SM resources to compute instead of graphics. If the SCG-SM arbiter requests MPC to devote less SM resources to compute instead of graphics, MPC may either wait for those old requests to return either a CTA launch or be Nacked by CWD, or may request 0 additional CTA launches when an existing CTA completes. This slowly moves resources back to graphics.

When MPC requests CTA launches from CWD, MPC must reserve the required SM resources for compute until those launches actually happen or are Nacked by CWD. These resources are not allocated to concurrent graphics warp launches and are reserved for compute. A new task sync may cause an implicit Nack for all prior reservations.

The SCG-SM arbiter may decide when compute can be launched and may inform MPC to calculate the number of CTAs it needs to request from CWD. MPC may initiate a CTA request to CWD with the number of CTAs requested depending on what fraction of SM resource compute should use. MPC may pre-allocate the space in SM for these CTAs and may only deallocate the resources on receiving a Nack from, for example, CWD. Therefore, when CTAs arrive from CWD, they may be configured to always win the selection inside MPC selectors for both shared memory allocation and register file/warp allocations. There may be no queueing or stalling of CTAs inside MPC.

At operation 918, it is determined whether a compute tasks were received or refused. If the request for compute task was refused (e.g., a Nack received, as described above), then at operation 920, the reserved resources are released.

The resource reservation may consider the different graphics element types in the graphics queue. For example, ISBE for VTG warps and shared memory for compute warps may get allocated to the same scratch pad memory in SM and therefore will compete for space, but TRAM on the pixel side will have carved out space. Hence, at least in some embodiments, ISBE and shared memory resource tracking in MPC may be unified to use the same resource counters. For register file and warp allocation, the resource tracking counters may be unified for compute and graphics.

If the request for compute tasks resulted in getting one or more tasks allocated (for example, from the CWD), then at operation 922, the tasks are launched.

After either the resource release step 920 or the launch step 922, at operation 924 it is determined whether the arbiter has signaled for non-greedy items (in this instance, graphics work items) to be trickled into launch. If yes, then process 900 proceeds to operation 908 to launch one or more graphics work items from the graphics queue.

If no, at operation 925 it is determined whether the scheduler is still in the compute-greedy mode. If the scheduler is still in compute-greedy mode, then at process 900 proceeds to operation 914 to launch more compute work items. If the scheduler is no longer in the compute-greedy mode, then, for example, process 900 may proceed to operation 908 to continue processing in the graphics-greedy mode. The number of graphics work items launched when it is to trickle while in the compute-greedy mode may be controlled by a policy-based parameter (e.g., the number of subtiles or batches specified by the GFX_MPC_RESOURCE_RESERVE parameter, which is typically set to 1 so that MPC will launch only 1 subtile (or other graphics work unit) for each graphics launch command from the SCG-SM arbiter).

The priority of graphics versus compute also affects instruction scheduling in the SM. The MPC may set a 2 bit priority of warps during warp launch onto SM: in graphics-greedy mode, SM may schedule with the following priority: VTG>PIX>COMP (e.g., vertex graphics>pixel graphics>compute); and in compute-greedy mode, SM may schedule with the following priority: COMP>VTG>PIX, in accordance with the priorities communicated from the MPC.

The SCG-SM arbiter arbitrates between compute/graphics and may provide inputs to the selectors inside MPC that select between the work types (e.g., simply graphics and compute, or vertex graphics, pixel graphics and compute). MPC may provide some feedback to enable the arbiter to make correct decisions. Once the SCG arbiter decides to launch compute, MPC generates CTAs requests to CWD and allocates space for those CTAs on the SM. This pre-arbitration for CTAs may be done to prevent queueing of CTAs in MPC and guarantee that once CTAs arrive they are always selected and sent to SM without stalls. In spite of how things get arbitrated, graphics and compute may essentially compete for following SM resources when in ComputeInGraphics mode: TRAM may be dedicated for pixel work; VTG and compute may compete for a shared pool of ISBE/shared memory; and VTG, PIX & compute will compete for local register file (LRF) and warp slots. In ComputeInGraphics mode, MPC may also take into account the graphics running on the SM for CTA slot calculation before sending CTA requests to CWD and it can request CTAs asynchronously based on the SCG-SM arbiter decision. Warps from VTG, pixel, and compute may be allowed to execute simultaneously on an SM.

Figure 10:
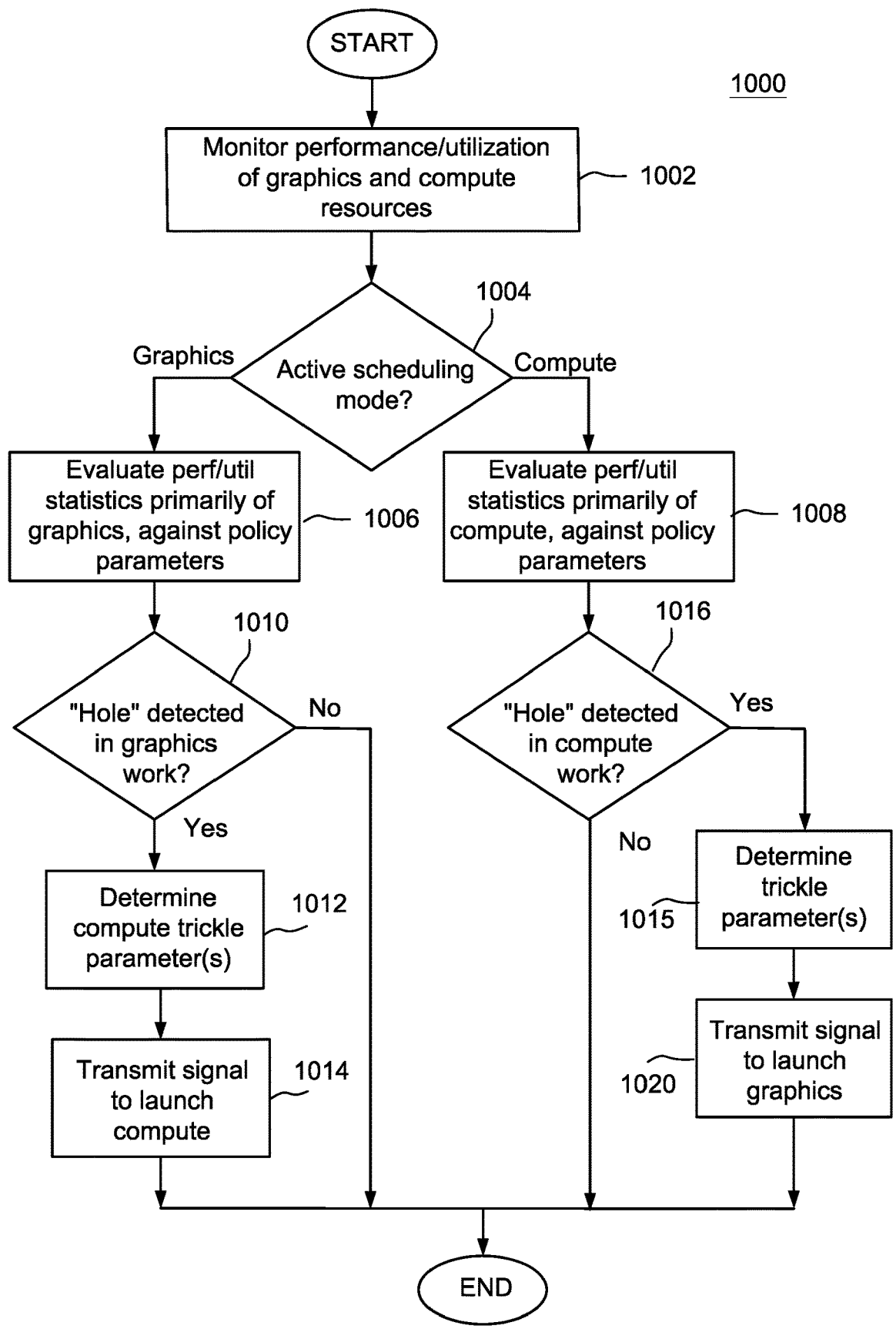
FIG. 10 shows a flowchart of a process that may be performed by an arbiter, such as the arbiter, according to some example embodiments.

FIG. 10 shows a flowchart of a process 1000 that may be performed by a hardware arbiter, such as the arbiter 710, according to some example embodiments.

After entering process 1000, at operation 1002, the arbiter (or other hardware unit) monitors a predetermined set of performance and/or utilization metrics for resources associated with the SM.

According to some embodiments, the MPC collects statistics about the graphics resource occupancy based on the DPC's usage of warp IDs, register file space, and ISBE memory, etc. It may also collect interface statistics related to whether graphics inputs are starving and graphics outputs are stalled. These interface and occupancy statistics may not be instantaneous, but integrated over some configurable time period.

The MPC may be configured to collect statistics about the compute resource occupancy based on the DPC's usage of warp IDs, register file space, and shared memory space, etc. It may also collect interface statistics related to whether compute inputs are starving. These interface statistics too may not be instantaneous, but integrated over some (similar to the case of graphics statistics) configurable time period.

The decision making based on the monitored statistics is dependent on the active priority mode. Therefore, at operation 1004, it is determined whether the scheduler and arbiter is in the graphics-greedy mode or in the compute-greedy mode.

MPC compares these sampled statistics to corresponding policy controls set by software. According to some embodiments, there may be a software threshold corresponding to every sampled statistic.

According to an embodiment, the MPC may make the following settings and statistics available to the SCG-SM arbiter logic: PRIORITY_TYPE, INPUT_STARVED_ALPHA, INPUT_STARVED_BETA, INPUT_STARVED_PIX, INPUT_STARVED_COMP, PE_ALPHA_OUT_STALL, PE_BETA_OUT_STALL, GPM_PIX_OUT_STALL, COMP_WARP_OCCUPANCY, COMP_SHM_OCCUPANCY, COMP_RF_OCCUPANCY, GFX_WARP_OCCUPANCY, GFX_ISBE_OCCUPANCY, and GFX_RF_OCCUPANCY.

The SCG-SM arbiter logic may compute the following per DPC: isGraphicsGreedy=(PRIORITY_TYPE GFX); isAlphaInputEmpty=(INPUT_STARVING_ALPHA< INPUT_STARVING_ALPHA_THRESHOLD); isBetaInputEmpty=(INPUT_STARVING_BETA<INPUT_STARVING_BETA_THRESHOLD); isPixInputEmpty=(INPUT_STARVING_PIX<INPUT_STARVING_PIX_THRESHOLD); isComputeInputEmpty=(INPUT_STARVING_COMP<INPUT_STARVING_COMP_THRESHOLD); isAlphaOutputStalled=(PE_ALPHA_OUT_STALL>PE_ALPHA_OUT_STALL_THRESHOLD); isBetaOutputStalled=(PE_BETA_OUT_STALL>PE_BETA_OUT_STALL_THRESHOLD); isPixOutputStalled=(GPM_PIX_OUT_STALL>GPM_PIX_OUT_STALL_THRESHOLD); isGraphicsEmptyOrStalled=(isAlphaInputEmpty||isAlphaOutputStalled) && (isBetaInputEmpty||isBetaOutputStalled) && (isPixInputEmpty||isPixOutputStalled); isGraphicsGreedyEnough=((GFX_WARP_OCCUPANCY>GFX_WARP_OCCUPANCY_THRESHOLD) && (GFX_RF_OCCUPANCY>GFX_RF_OCCUPANCY_THRESHOLD) && (GFX_ISBE_OCCUPANCY>GFX_ISBE_OCCUPANCY_THRESHOLD)); isComputeGreedyEnough=((COMP_WARP_OCCUPANCY>COMP_WARP_OCCUPANCY_THRESHOLD) && (COMP_RF_OCCUPANCY>COMP_RF_OCCUPANCY_THRESHOLD) && (COMP_SHM_OCCUPANCY>COMP_SHM_OCCUPANCY_THRESHOLD)).

If in the graphics-greedy mode, then at operation 1006, the monitored statistics are evaluated based primarily on graphics-related statistics, to determine whether a hole can be found in the current resource utilization. At operation 1010, it is determined whether or not a hole has been identified using the current statistics. For example, with the above example statistics, an evaluation of "!isGraphicsGreedyEnough||isGraphicsEmptyOrStalled" to TRUE, or "!isGraphicsGreedyEnough && isGraphicsEmptyOrStalled" to TRUE may be representative of a hole being determined while in graphics-greedy mode.

If a "hole" exists, then at operation 1012, parameters for requesting compute work items can be determined. For example, the trickle rate for compute work items (e.g., COMP_MPC_RESOURCE_RESERVE) may be determined from policy configurations.

Based on whether the priorities place MPC in graphics-greedy or compute-greedy mode, and based on how the graphics/compute statistics compare the corresponding thresholds, the arbiter selects whether graphics or compute should launch next.

For example, after the above computations, the SCG-SM arbiter logic may decide to launch graphics or compute in the following way: If (isGraphicsGreedy): If (isGraphicsEmptyOrStalled && !isComputeInputEmpty) then launch compute; and If (!isGraphicsGreedyEnough && !isComputeInputEmpty) then launch compute. Otherwise, the scheduler continues to launch graphics.

Graphics work can launch immediately since it is typically pending in the MPC input queues. Compute work, however in some embodiments, cannot launch immediately, it must first negotiate with CWD. So when the arbiter grants compute, MPC checks if the number of CTAs specified in COMP_MPC_RESOURCE_RESERVE (NCTA) fits in the remaining space on this TPC. It exposes this NCTA count to CWD and reserves the resources for the NCTA (typically the value of NCTA should be set to '1' for graphics greedy since we want CTAs to trickle into the empty space when graphics is running). CWD must respond by either launching up to N CTAs, or by nacking the remaining reservation once all CTAs have been launched to other TPCS (or the task is de-scheduled from CWD for some reason).

At operation 1014, the arbiter signals (e.g., a launch command) the scheduler to launch one or more compute work items. The signal may indicate a number or other indication of how many such compute work items are to be launched.

If at operation 1004, it is determined that the active priority mode is the compute-greedy mode, then at operation 1008, the monitored statistics are evaluated based primarily on compute-related statistics, to determine whether a "hole" can be found in the current resource utilization.

At operation 1016, it is determined whether or not a "hole" has been identified using the current statistics.

If a "hole" exists, then at operation 1018, parameters for requesting graphics work items can be determined. For example, the trickle rate for graphics work items (e.g., GFX_MPC_RESOURCE_RESERVE) may be determined from policy configurations.

For example, If (isComputeGreedy): If (isComputeInputEmpty && !isGraphicsEmptyOrStalled) then launch graphics; and If (isComputeGreedyEnough && !isGraphicsEmptyOrStalled) then launch graphics.

After a "no" determination at operations 1010 or 1016, after operation 1014 or operation 1020, process 1000 may terminate.

Figure 11:
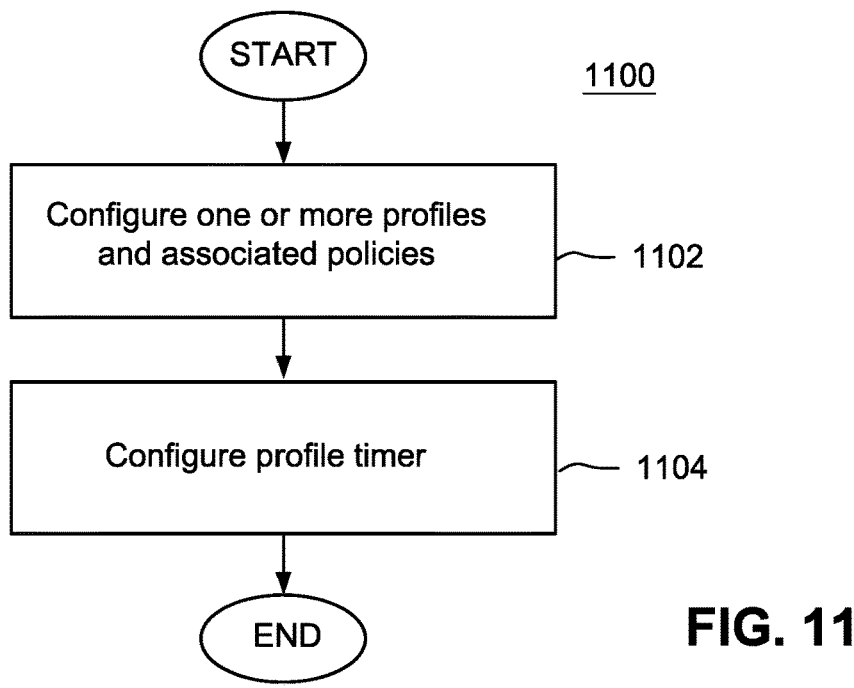
FIG. 11 illustrates a flowchart of a process that can be performed by an application or other program at a host processor such as a CPU, in order to configure on or more scheduling profiles and a timer for switching between the scheduling profiles.
Figure 12:
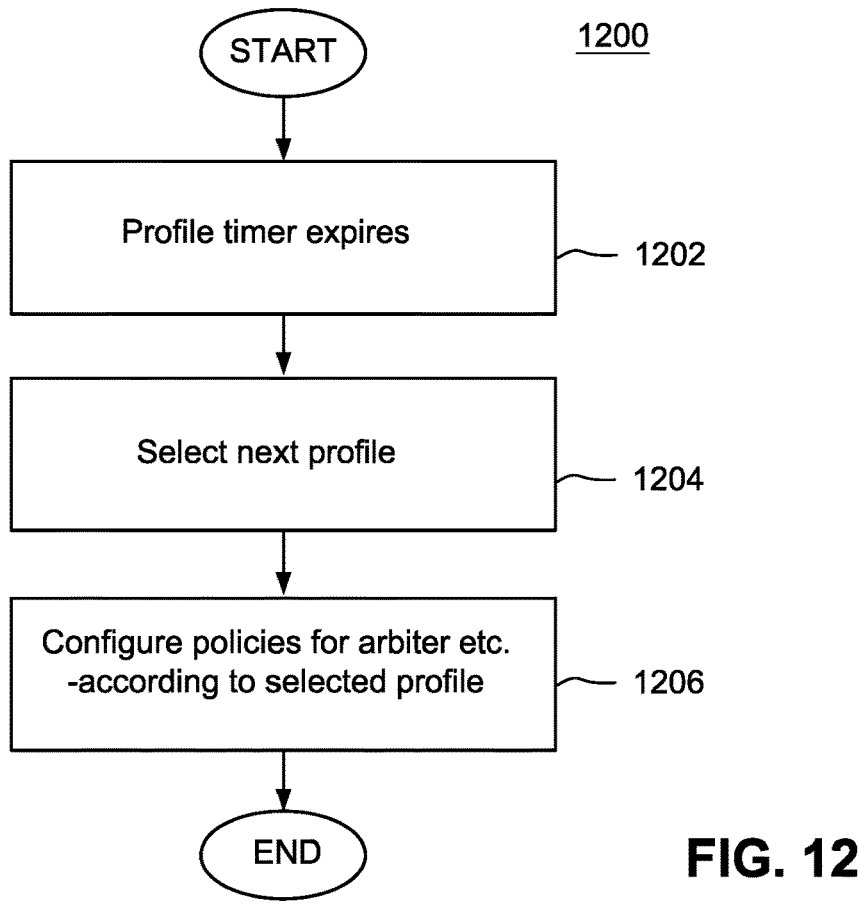
FIG. 12 illustrates a flowchart of a process that may be performed in a GPU, or in some embodiments, in an M-Pipe Controller (MPC), to switch scheduler profiles in a sequence of configured scheduler profiles.

FIGS. 11 and 12 describe processes associated with some example embodiments in which multiple scheduling profiles can be configured and used.

FIG. 11 illustrates a flowchart of a process 1100 that can be performed by an application or other program at a host processor such as a CPU, in order to configure on or more scheduling profiles and a timer for switching between the scheduling profiles.

At operation 1102, the program configures one or more scheduler profiles and associated policies. Each profile may include different combinations of policies and/or different values for certain thresholds in the policies. The policies may include, for example, threshold values for resource utilization for graphics and for compute, trickle rates for graphics and for compute, etc.

At operation 1104, the program may configure a timer that can be used for switching between configured scheduling profiles.

FIG. 12 illustrates a flowchart of a process 1200 that may be performed in a GPU, or in some embodiments, in an MPC such as MPC 702, to switch scheduler profiles in a sequence of configured scheduler profiles.

Software (e.g., application and/or driver executing on the host processor/CPU) may have the option to set most of the arbiter thresholds statically across the whole frame, or it can dynamically adjust them synchronous with the workload by inserting threshold changing methods directly into the graphics or compute work streams.

Additionally, process 1200 provides a capability to dynamically change the arbiter setting in an asynchronous manner using microcode. Software may set up several sets of arbitration parameters. Each set of parameters is called an arbiter "profile". Each profile contains the complete set of graphics scheduling parameters and compute scheduling parameters as defined above. It may also contain the graphics priority. The compute priority may be determined from the compute work item data structures. Each profile also has a timeslice value (e.g., in Sysclk cycles) and a valid bit that may indicate whether the each profile is usable. In some embodiments, the microcode may support up to 8 profiles.

At operation 1202, the profile timer expires. When the profile timer expires, in some embodiments, a non-blocking interrupt may be asserted to a profile switching block (e.g., in the front end unit) that can fetch a data structure in memory containing the arbiter profiles.

At operation 1204, the next profile is selected. The profile switching block may find the next valid profile and update (all or only some of) the scheduling parameters in MPC. At operation 1206, policies are configured in accordance with the selected next profile.

In this way, the arbiter can be reconfigured on the fly without any software intervention. One use case may be to toggle between two profiles. The first may be graphics greedy profile that runs for a certain number (e.g., X) of cycles, and the second may be a compute greedy profile that runs for another predetermined number (e.g., Y) of cycles. If X=4*Y, then this would provide 20% guaranteed service to compute no matter how much graphics work is present. Of course, this use case is merely an example, and numerous other ways of utilizing the profile switching capabilities in embodiments can be envisaged.

Figure 13:
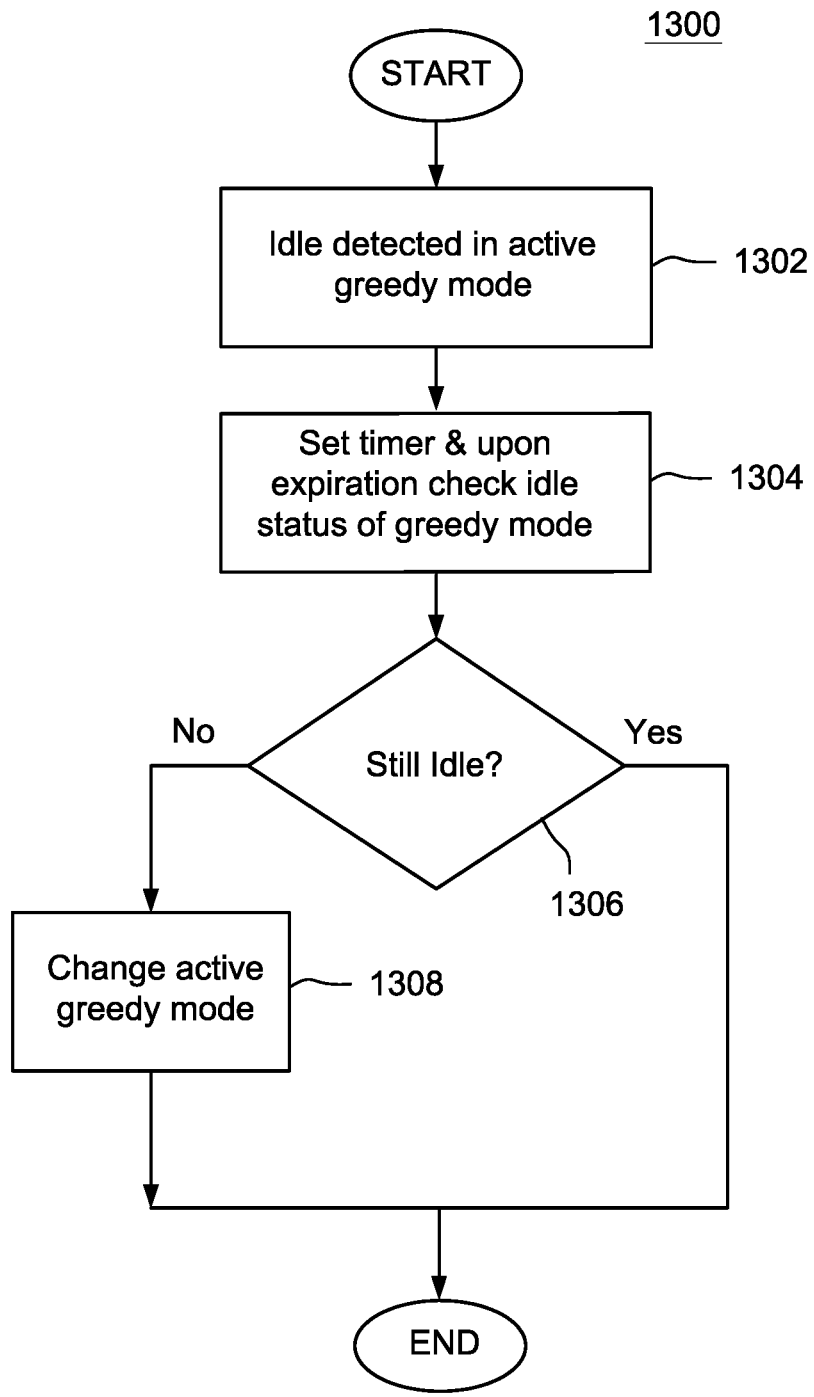
FIG. 13 illustrates a flowchart for an idle detection process 1300 according to some example embodiments.

FIG. 13 illustrates a flowchart for an idle detection process 1300 according to some example embodiments. Process 1300 may operate to switch the active priority mode of the scheduler when it is detected that the current active priority mode is idle.

After entering process 1300, at operation 1302, it is detected that the active greedy mode has become idle. For example, the scheduler may, while in graphics-greedy mode, detect that the graphics queue (e.g., any of the alpha, beta or pixel queues) is empty.

At operation 1304, optionally, a hysteresis timer is set, and the process is 1300 is delayed by some configurable time interval. The process 1300 proceeds to operation 1306, after the expiration of the hysteresis timer if one was set.

At operation 1306, it is determined whether the active priority mode is still idle, and if yes, at operation 1308, the active priority mode is changed. For example, if the current active priority mode is the graphics-greedy mode and it is determined to be idle, then the active priority mode is switched to compute-greedy.

In some example embodiments, operations 1302-1306 may include the MPC monitoring a bit each for the compute queue and the graphics queue, where each bit has hysteresis such that they will be indicated as idle slowly over time rather than instantaneously. Moreover, in order to switch active priority modes, in addition to determining that the active priority mode is idle, it must also be determined that the current non-greedy queue is not empty.

If switching from graphics-greedy to compute-greedy is caused by idle detection logic, then by definition the graphics pipe is empty. In this case, MPC may switch to compute-greedy immediately but may be required to initiate a new CTA request with all available free slots to CWD so that it can receive CTA launches. If switching from compute-greedy to graphics-greedy is caused by idle detection logic, then by definition compute pipe is empty. In this case, MPC may switch to graphics-greedy immediately & start processing graphics work.

Other SCG-SM Arbiter Types

In some embodiments, different types of the SCG-SM arbiters may be used as alternative hardware arbiters each with its own advantages and disadvantages: a round-robin arbiter located in the MPC, a DPC-level SCG-SM arbiter located in the MPC (described above as the "non-balanced" arbiter), a balanced GPC-level SCG-SM arbiter located in GPM so that it has control over multiple TPC, and a dynamic partitioned SCG-SM arbiter in GPM also so that it has control over multiple TPC.

With the round robin arbiter, the arbiter decides to launch compute in a round-robin manner with respect to graphics types such as alpha, beta and pixel queues. When it is compute's turn, the round-robin arbiter may launch one (or other predetermined number of) CTA. When it is graphics' turn, the round-robin arbiter may launch 1 batch, or task, or subtile depending on what the graphics arbitration logic decides between alpha, beta and pixel work. As described above with respect to the non-balanced arbiter, compute and graphics launch may be different.

For example, assuming that an infinite stream of compute and graphics work is available in the respective queues, that the SM can hold up to 20 units of work, that each graphics request requires 2 units, and that each compute request requires 5 units, a sequence of work granted by the round robin arbiter may be: G2, C5, G2, C5, G2, no more compute fits, so G2, G2. More work would be granted as warps complete.

The balanced GPC-level SCG-SM arbiter inside GPM attempts to consider workloads of SMs across the GPC, and to balance the work. More specifically, this arbiter is located centrally in the GPM and considers many SMs to decide when to launch the non-greedy work.

This arbiter aggregates the feedback/statistics from many SMs instead of looking at them individually to determine holes in resource utilization by comparing to policy-specified threshold values. Once the arbiter decides to run the non-greedy work, the decision is broadcast to all SMs in the GPC. This manner of work distribution may result in the greedy work being more balanced across SMs.

The policy controls for this balanced arbiter may include some or all of the policy controls described above with respect to the non-balanced arbiter. Policy controls for this arbiter may additionally include SCG_GRANULARITY_SEL which is programmed to select the granularity of arbiter dynamic allocation (e.g., SCG_GRANULARITY_SEL=SUB_SM means SCG arbiter will dynamically allocate/deallocate at sub-SM granularity between compute and graphics), BALANCE_TPC_IN_GPC which is a boolean setting when 'True' informs the arbiter to balance all DPCs in the GPC ('False' means let DPCs be on their own), GFX_TPC_OCCUPANCY_MIN which represents a guaranteed minimum DPC allocation for graphics, and COMP_TPC_OCCUPANCY_MIN which represents a guaranteed minimum DPC allocation for compute.

The dynamic partitioned SCG-SM arbiter inside GPM is another arbiter that attempts to balance work across multiple SMs across a GPC. Like the balanced arbiter type, this arbiter too is centrally located and aggregates the input across many SMs. This arbiter arbitrates resources dynamically at SM granularity, rather than negotiating between compute and graphics at warp granularity. This arbiter does not result in a drain interlock causing under-utilization when switching SMs between graphics and compute. Instead the draining of work from one type can be happening at the same time when SM is ramping up work from another type. This arbiter may provide a way to seamlessly transition SMs from one type to another based on the requirements of the workload (through dynamic hardware arbitration) without spending cycles doing an explicit drain.

The policy controls for this balanced arbiter may include some or all of the policy controls described above with respect to the non-balanced arbiter. Policy controls for this arbiter may additionally include SCG_GRANULARITY_SEL which is programmed to select the granularity of arbiter dynamic allocation (e.g., SCG_GRANULARITY_SEL=TPC means SCG arbiter will dynamically allocate/deallocate DPCs between compute and graphics first before using sub-SM allocation); BALANCE_TPC_IN_GPC which is always set to "True" (e.g., Assert if "False"); TPC_MASK_MIXED which is the fixed mask of DPCs per GPC which will run both graphics and compute at the same time; MIN_TPC_MASK_GFX which is the minimum number of DPCs per GPC guaranteed to graphics (excluding the mixed DPCs); MIN_TPC_MASK_COMP which is the minimum number of DPCs per GPC guaranteed to compute; and CURR_GFX_EN [numTPCperGPC] which is an output request sent by the arbiter at per MPC granularity and which informs the MPC when to switch to graphics and when to switch to compute.

The arbiter internal state may include CURR_GFX_TPC_MASK which is a state that keeps track of which DPCs in the GPC are assigned to graphics by the SCG-SM arbiter; and CURB_COMP_TPC_MASK which is a state that keeps track of which DPCs in the GPC are assigned to compute by the SCG arbiter.

Example Use Cases

The above techniques of scheduling and profile time slicing can be controlled in various ways in accordance with workload requirements. One may consider controlling the scheduling and time slicing, for example, either synchronously with 3D/compute work or asynchronously with 3D/compute work. Example embodiments provide applications with the capability to have such control over the processing in a PPU.

In some aspects, the scheduling profiles can be changed synchronously with 3D/compute work. For example, software can insert new scheduling parameters via graphics work items in a way that is synchronous with the work in the pipeline. The work items in the pipeline may overwrite the current profile in MPC. Control synchronous with 3D/compute work may involve either changing only graphics and compute priorities, or may involve all (or a larger set of) profile parameters.

In some examples where the scheduling profiles are changed synchronously with 3D/compute work, all the scheduling parameters in MPC may be statically set and only the graphics and compute priorities may be varied. As noted above, the compute priority may be attached to each compute work item data structure as it is built, and the graphics priority may be supplied by a command in the 3D pipe. Changing the priority affects whether the scheduler operates in graphics-greedy or compute-greedy mode. For example, the driver could hold the graphics priority steady at 16 and mark low priority compute work items at 8 and high priority compute work items at 24. When only graphics and low priority compute work exists, the arbiter will operate in graphics-greedy mode, and when a high priority compute work item arrives, it will force CWD to stop distributing the low priority grid and switch to the high priority one. MPC will see the increased compute priority and switch the arbiter into compute-greedy mode until all the high priority compute work is launched.

Software can mark synchronous compute work as higher priority than asynchronous compute work, causing CWD to prefer launching the synchronous compute work, which is typically to be completed before more 3D or 2D work can be launched, to allow more simultaneous compute and graphics overlap.

Note, the graphics pipeline may consist of three sequential stages: alpha, beta, and pixel, and that in some embodiments changes to the graphics priority are decoded just before the pixel shader stage. For example, in the following command sequence: graphics priority=16; draw A; graphics priority=32; draw B, the pixel work for draw A is guaranteed to execute at priority 16, and the pixel work for draw B is guaranteed to execute at priority 32. The effect on the associated VTG work is less clear. The VTG work for draw A is guaranteed to execute at priority 16, but the VTG work for draw B may execute at 16 or 32, depending on how long the pixel work for A delays the command raising the graphics priority. However, tying the graphics priority to the pixel shader stage may be beneficial because most games are typically pixel shader dominated.

The compute priority is typically supplied in example embodiments by the one compute work item being rasterized by CWD. Since the compute pipeline has only one stage, the compute shader stage, there are no pipelining issues like with graphics. The SCG-SM arbiter in MPC may compare compute priority from one currently launching compute work item from CWD with the graphics priority in the pixel pipe, i.e. the SCG-SM arbiter in MPC is completely unaware of multiple compute work item priorities.

In some examples where the scheduling profiles are changed synchronously with 3D/compute work, software may vary not only the priority, but also the graphics and compute scheduling parameters. In example embodiments, this can be done synchronously with the 3D work item stream so that the pixel work is guaranteed to be affected. Software can raise the priority of a certain draw to make sure it executes in graphics-greedy mode, or it could increase the graphics-greediness of a certain draw (e.g., make it extremely greedy).

In contrast, compute work item stream and compute work item launches are not necessarily synchronized in the compute pipeline. Changes to the compute scheduling parameters may not blocked by prior compute work items that have not launched, but instead may flow immediately to MPC. So if software wants to guarantee that a first compute work item sees the first set of parameters and the second compute work item sees the second set of parameters, it may be required to trigger the synchronization.

Another way for software to use the SCG-SM arbiter is via multiple profiles and microcode. Here are the scheduling parameters may be kept in a context buffer in memory. Software can create a predetermined number of profiles (e.g., 8) and each profile may include a valid bit and a timeslice value. Software may not send any of the scheduling parameters via graphics commands, and instead they may be supplied by writes by microcode to registers. Software may however supply the graphics priority via a command, or these may also come from the profiles and microcode writes. Software may program N valid profiles into memory, and associate each profile with a timeslice value. A profile timer may be set as each profile is activated, and when the timer expires, the hardware may be moved to the next valid profile and the timer restarted. The scheduling parameters for both compute and graphics may be updated, and optionally the graphics priority may also be updated, all via writes by hardware/microcode to MPC. These writes can be broadcast to all MPCs simultaneously since they may all be programmed identically. The compute priority may still be determined from compute work item data structures. In this way, microcode can be used to asynchronously move the scheduler between various profiles. This may be used to allow some amount of guaranteed service to compute, or some amount of guaranteed service to graphics, or any other desired combination of simultaneous compute and graphics.

Similarly, rather than using fixed timeslices to rotate between N profiles, the microcode itself may pick the best profile, in some embodiments. Here the interval timer maybe set to some fixed value (e.g., say 100K cycles=~100 us). Every time the microcode sees the interrupt, it may read registers around the chip to determine if the current regime is frame buffer limited, L2 limited, shader math limited, heavy with graphics but light with compute, etc. The microcode may use this information to pick between N precomputed profiles that are tuned for various application regimes.

Example embodiments provide numerous improvements to GPUs and GPU-based processing. The programmability controls in the hardware scheduler of certain embodiments enable flexibility in reacting to different work mixes and other requirements imposed by new games and other applications. This programmability of the hardware scheduler also allows different mixes of compute and graphics work enabling game developers and the like to explore new applications and programming techniques.

In some example embodiments, a portion of the compute workload, such as where some frames use compute techniques to post process the graphics data at the end of the frame, can be processed without extending the frame processing time at all by executing the graphics at the highest priority, and trickling in the compute wherever resource availability is found.

Example embodiments may also speed up simulations etc. that are enabled by the likes of PhysX which is a library for adding physics simulations (particle based fluids, life-like explosions, etc.) to a game. When run on the GPU, PhysX typically forms a second thread of compute work, independent from the compute techniques that are already present in a typical game. The PhysX compute work can also substantially trickle in between graphics work items being processed in graphics-greedy mode.

Certain example embodiments may allow CUDA workloads in conjunction with traditional graphics efficiently, which may be useful in certain deep learning or other applications which are accelerated for CUDA inside games etc. The hardware scheduler may also enable ray tracing and the like by allowing compute for ray tracing to be prioritized over typical graphics work running in the system. Certain example embodiments, due to the programmability of the hardware scheduler, may also provide improved usability for GPU-based physics applications by lowering the percentage of frame time that must be dedicated to physics computations. Certain example embodiments may enable improved virtual reality applications. For example, compute is used to modify the final frame image based on the latest sampling of head position, and the asynchronous compute work wants to execute at the highest priority so that it can guarantee to complete just before the next display event.

What is claimed is:

1. A processing system, comprising:
a Single Instruction Multiple Data (SIMD) or Single Instruction Multiple Thread (SIMT) processor that executes parallel instruction streams and is configured to operate in a graphics-greedy mode or a compute-greedy mode at respective times;
a hardware scheduler connected to the processor, the hardware scheduler scheduling the processor to simultaneously execute, in parallel, at least one graphics warp and at least one compute warp by selecting between (a) scheduling at least one compute warp to the processor while operating in the graphics-greedy mode repeatedly scheduling graphics warps to the processor from a graphics pipeline, and (b) scheduling at least one graphics warp to the processor while operating in the compute-greedy mode repeatedly scheduling compute warps to the processor from a compute pipeline; and
a hardware arbiter configured to, in response to a detected underutilization of a resource associated with the processor during said scheduling, determining a current operating mode of the processor and signaling the hardware scheduler to perform said scheduling at least one compute warp when the current operating mode is the graphics-greedy mode or said scheduling at least one graphics warp when the current operating mode is the compute-greedy mode.

2. A parallel processing unit, comprising:
a plurality of processing units, each processing unit configured to operate in a graphics-greedy mode or a compute-greedy mode at respective times, and to simultaneously run graphics work items from a graphics queue and compute work items from a compute queue;
a hardware scheduler configured to continuously select graphics work items from the graphics queue for running on a particular processing unit of the plurality of processing units when the particular processing unit is configured to operate in the graphics-greedy mode, and to continuously select compute work items from the compute queue for running on the particular processing unit when the particular processing unit is configured to operate in the compute-greedy mode; and a hardware arbiter configured to, in response to a result of a comparison of at least one monitored performance or utilization metric to a user-configured threshold, selectively cause the particular processing unit to run one or more compute work items from the compute queue when the particular processing unit is configured to operate in the graphics-greedy mode, and to cause the particular processing unit to run one or more graphics work items from the graphics queue when the particular processing unit is configured to operate in the compute-greedy mode.

3. The parallel processing unit according to claim 2, wherein each of the plurality of processing units is a single instruction multiple data (SIMD) processor or a single instruction multiple thread (SIMT) processor.

4. The parallel processing unit according to claim 2, wherein the hardware scheduler is further configured to select the graphics-greedy mode or the compute-greedy mode based at least upon software-configured priority values associated with said graphics work items and compute work items.

5. The parallel processing unit according to claim 4, wherein the hardware arbiter is further configured to select causing running of either compute work items or graphics work items based upon a software-configured scheduling policy.

6. The parallel processing unit according to claim 5, wherein the hardware arbiter is further configured to select causing running of either compute work items or graphics work items based further upon occupancy metrics corresponding to occupancy of processing and memory resources by graphics work items and compute work items.

7. The parallel processing unit according to claim 6, wherein the hardware arbiter is further configured to select causing running of either compute work items or graphics work items based upon metrics in said particular processing unit.

8. The parallel processing unit according to claim 6, wherein the hardware arbiter is further configured to select causing running of either compute work items or graphics work items based upon metrics in said particular processing unit and other processing units.

9. The parallel processing unit according to claim 6, wherein the hardware arbiter is further configured to select causing running of either compute work items or graphics work items based further upon output stalling metrics associated with graphics work items output from said processing unit and upon input starving metrics associated with input of graphics work items and compute work items to said processing unit.

10. The parallel processing unit according to claim 9, wherein the hardware arbiter is further configured to select causing running of either compute work items or graphics work items based further upon time-averaged values of said occupancy metrics, said output stalling metrics associated with graphics work items and said input starving metrics associated with input of graphics work items and compute work items.

11. The parallel processing unit according to claim 10, wherein the occupancy metrics comprises one or more of occupancy metrics for register files, occupancy metrics for warp resources, occupancy metrics for shared memory, and occupancy metrics for ISBE memory, wherein said input starving metrics associated with graphics work items comprising at least one of a vertex-associated queue and a pixel-associated queue, wherein said input starving metrics associated with compute work items comprising starving metrics associated with the compute queue, and wherein said output stalling metrics associated with graphics work items comprising output stalling metrics for at least one of a vertex-associated queue and a pixel-associated queue.

12. The parallel processing unit according to claim 9, wherein the output stalling metrics include effects of back pressure from one or more fixed-function units processing graphics work items.

13. The parallel processing unit according to claim 4, wherein the hardware scheduler or the hardware arbiter is further configured to determine a number of work items to be selected from the graphics queue or the compute queue based upon a respective trickle parameter specified in a software-specified policy.

14. The parallel processing unit according to claim 2, wherein the hardware scheduler is further configured to in response to determining to launch a group of graphics work items to the particular processing unit, launch one or more graphics work items already assigned to the hardware scheduler; and in response to determining to launch a group of compute work items:

reserve resources associated with the particular processing unit for a particular number of compute work items; and request the particular number of compute work items from the compute queue.

15. The parallel processing unit according to claim 14, wherein the hardware scheduler is further configured to, in response to determining to launch the group of compute work items:

launch compute work items received in response to the requesting on the particular processing unit, or not launch compute work items in response to receiving a negative acknowledgment to the requesting.

16. The parallel processing unit according to claim 15, wherein the hardware scheduler is further configured to pass priority information to the particular processing unit with the launching of the graphics work items or the launching of the compute work items.

17. The parallel processing unit according to claim 2, wherein the hardware scheduler is further configured to automatically change an active scheduling policy, and wherein the changing includes changing said user-configured threshold.

18. The parallel processing unit according to claim 17, wherein the automatic changing is adaptive to workload.

19. The parallel processing unit according to claim 17, wherein the automatic changing comprises asynchronously switching between multiple preconfigured scheduling profiles to change the active scheduling policy, each preconfigured scheduling profile including a respectively different set of scheduling policies.

20. The parallel processing unit according to claim 2, wherein the hardware scheduler and/or hardware arbiter receive metrics from a plurality of processing units.

21. A method for performing graphics work items and compute work items simultaneously on a parallel processor having a plurality of processing units, comprising:

receiving the graphics work items from a graphics pipeline and the compute work items from a compute pipeline; and scheduling a first group of said graphics work items and a second group of said compute work items to simultaneously execute on a selected single instruction multiple data (SIMD) or single instruction multiple thread (SIMT) processing unit of the plurality of processing units, wherein the scheduling further comprises selecting the first group and the second group based further upon output stalling metrics associated with graphics work items output from said processing unit and upon input starving metrics associated with input of graphics work items and compute work items to said processing unit.

22. The method according to claim 21, wherein the scheduling comprises selecting the first group and the second group based at least upon software-configured priority values associated with respective groups of said graphics work items and compute work items.

23. The method according to claim 22, wherein the scheduling comprises selecting the first group and the second group based further upon a software-configured scheduling policy.

24. The method according to claim 22, wherein the scheduling further comprises selecting the first group and the second group based further upon occupancy metrics corresponding to occupancy of processing and memory resources by graphics work items and compute work items.

25. The method according to claim 21, wherein the selecting is further based upon time-averaged values of occupancy metrics corresponding to occupancy of processing and memory resources by graphics work items and compute work items, said output stalling metrics associated with graphics work items and said input starving metrics associated with input of graphics work items and compute work items.

26. A system, comprising:
a CPU configured to execute an application;
a memory configured to have a graphics queue to which graphics work items from the application are enqueued, and a compute queue to which compute work items from the application are enqueued; and
a graphics processing unit (GPU) comprising:
a plurality of processing units, each processing unit configured to operate in a graphics-greedy mode or a compute-greedy mode at respective times, and to simultaneously run graphics work items from the graphics queue and compute work items from the compute queue;
a hardware scheduler configured to continuously select graphics work items from the graphics queue for running on a particular processing unit of the plurality of processing units when the particular processing unit is configured to operate in the graphics-greedy mode, and to continuously select compute work items from the compute queue for running on the particular processing unit when the particular processing unit is configured to operate in the compute-greedy mode; and
a hardware arbiter configured to, in response to a result of a comparison of at least one monitored performance or utilization metric to a user-configured threshold, selectively cause the particular processing unit to run one or more compute work items from the compute queue when the particular processing unit is configured to operate in the graphics-greedy mode, and to cause the particular processing unit to run one or more graphics work items from the graphics queue when the particular processing unit is configured to operate in the compute-greedy mode.

* * * * *